(12) United States Patent
Shimshi

(10) Patent No.: US 8,335,582 B2
(45) Date of Patent: Dec. 18, 2012

(54) SOFTWARE APPLICATION TO ANALYZE EVENT LOG AND CHART TOOL FAIL RATE AS FUNCTION OF CHAMBER AND RECIPE

(75) Inventor: Rinat Shimshi, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 853 days.

(21) Appl. No.: 12/368,760

(22) Filed: Feb. 10, 2009

(65) Prior Publication Data

US 2009/0287339 A1 Nov. 19, 2009

Related U.S. Application Data

(60) Provisional application No. 61/128,265, filed on May 19, 2008.

(51) Int. Cl.
*G06F 19/00* (2006.01)

(52) U.S. Cl. ............................ 700/108; 700/110; 702/85

(58) Field of Classification Search .................. 700/108, 700/110, 121; 714/57; 702/81, 181–183, 702/185; 438/14
See application file for complete search history.

(56) References Cited

U.S. PATENT DOCUMENTS

| | | | |
|---|---|---|---|
| 5,311,562 A | 5/1994 | Palusamy et al. | |
| 5,442,562 A | 8/1995 | Hopkins et al. | |
| 5,544,308 A | 8/1996 | Giordano et al. | |
| 5,623,109 A * | 4/1997 | Uchida et al. | 73/865.9 |
| 5,694,401 A | 12/1997 | Gibson | |
| 6,088,676 A | 7/2000 | White | |
| 6,202,181 B1 | 3/2001 | Ferguson et al. | |
| 6,421,571 B1 * | 7/2002 | Spriggs et al. | 700/17 |
| 6,560,736 B2 | 5/2003 | Ferguson et al. | |
| 6,625,688 B1 | 9/2003 | Fruehling et al. | |
| 6,678,569 B2 | 1/2004 | Bunkofske et al. | |
| 6,731,990 B1 | 5/2004 | Carter et al. | |
| 6,775,576 B2 * | 8/2004 | Spriggs et al. | 700/8 |
| 6,775,819 B1 | 8/2004 | Hardikar et al. | |

(Continued)

FOREIGN PATENT DOCUMENTS

JP 06-347379 12/1994

(Continued)

OTHER PUBLICATIONS

Notification of Transmittal of the International Search Report and the Written Opinion of the International Searching Authority, or the Declaration for PCT/US2009/044243, mailed Dec. 29, 2009 (12 pages).

(Continued)

*Primary Examiner* — Dave Robertson
(74) *Attorney, Agent, or Firm* — Blakely, Sokoloff, Taylor & Zafman LLP

(57) ABSTRACT

In one embodiment, a method for providing a user interface to graphically indicate a cause for fault-related events includes providing a user interface to illustrate a plurality of fault-related events for a plurality of recipes performed on a plurality of manufacturing process hardware tools, presenting in the user interface the plurality of recipes in a first axis and the plurality of manufacturing process hardware tools in a second axis, and graphically indicating in the user interface whether the plurality of fault-related events were caused by one of the plurality of manufacturing process hardware tools or one of the plurality of recipes performed on the one manufacturing process hardware tools.

24 Claims, 20 Drawing Sheets

U.S. PATENT DOCUMENTS

| | | | |
|---|---|---|---|
| 6,868,342 B2 | 3/2005 | Mutter | |
| 6,889,096 B2 * | 5/2005 | Spriggs et al. | 700/17 |
| 6,907,545 B2 | 6/2005 | Ramadei et al. | |
| 6,954,883 B1 | 10/2005 | Coss, Jr. et al. | |
| 6,954,884 B2 | 10/2005 | Dean et al. | |
| 7,062,411 B2 | 6/2006 | Hopkins et al. | |
| 7,072,794 B2 | 7/2006 | Wittkowski | |
| 7,079,677 B2 | 7/2006 | Tai et al. | |
| 7,089,154 B2 | 8/2006 | Rasmussen et al. | |
| 7,099,815 B2 | 8/2006 | Christodoulou et al. | |
| 7,151,976 B2 | 12/2006 | Lin | |
| 7,169,625 B2 * | 1/2007 | Davis et al. | 438/9 |
| 7,349,753 B2 | 3/2008 | Paik | |
| 7,355,693 B2 | 4/2008 | Takeda et al. | |
| 7,413,546 B2 | 8/2008 | Agutter et al. | |
| 7,587,296 B2 | 9/2009 | Harvey et al. | |
| 7,596,718 B2 | 9/2009 | Harvey, Jr. et al. | |
| 7,765,020 B2 * | 7/2010 | Lin et al. | 700/108 |
| 7,831,326 B2 * | 11/2010 | Lin et al. | 700/108 |
| 7,974,723 B2 | 7/2011 | Moyne et al. | |
| 8,010,321 B2 * | 8/2011 | Lin et al. | 702/185 |
| 2002/0143472 A1 | 10/2002 | Mutter | |
| 2003/0100131 A1 | 5/2003 | Fang et al. | |
| 2003/0109951 A1 | 6/2003 | Hsiung et al. | |
| 2003/0171897 A1 | 9/2003 | Bieda et al. | |
| 2003/0225466 A1 | 12/2003 | Yulevitch et al. | |
| 2004/0002842 A1 | 1/2004 | Woessner et al. | |
| 2004/0024543 A1 | 2/2004 | Zhang et al. | |
| 2004/0110310 A1 | 6/2004 | Sun et al. | |
| 2004/0210850 A1 | 10/2004 | Bermudez et al. | |
| 2004/0254762 A1 | 12/2004 | Hopkins et al. | |
| 2005/0010117 A1 | 1/2005 | Agutter et al. | |
| 2005/0033527 A1 | 2/2005 | Wada et al. | |
| 2005/0060103 A1 | 3/2005 | Chamness | |
| 2005/0114023 A1 | 5/2005 | Williamson et al. | |
| 2005/0114743 A1 | 5/2005 | Moorhouse | |
| 2005/0221596 A1 | 10/2005 | You et al. | |
| 2006/0111804 A1 | 5/2006 | Lin | |
| 2006/0149990 A1 | 7/2006 | S. et al. | |
| 2007/0006037 A1 | 1/2007 | Sargusingh et al. | |
| 2007/0021859 A1 | 1/2007 | Lev-Ami et al. | |
| 2007/0028220 A1 | 2/2007 | Miller et al. | |
| 2007/0038418 A1 | 2/2007 | Ahn et al. | |
| 2007/0067678 A1 | 3/2007 | Hosek et al. | |
| 2007/0192064 A1 * | 8/2007 | Nakamura et al. | 702/185 |
| 2008/0195241 A1 | 8/2008 | Lin et al. | |
| 2008/0229318 A1 | 9/2008 | Franke | |
| 2008/0276137 A1 | 11/2008 | Lin et al. | |
| 2009/0118842 A1 | 5/2009 | Norman et al. | |
| 2009/0119077 A1 | 5/2009 | Norman et al. | |
| 2009/0228129 A1 | 9/2009 | Moyne et al. | |
| 2010/0076729 A1 | 3/2010 | Davis et al. | |

FOREIGN PATENT DOCUMENTS

| | | |
|---|---|---|
| WO | WO-2009/143031 | 11/2009 |
| WO | WO-2010/093821 | 8/2010 |

OTHER PUBLICATIONS

International Preliminary Report on Patentability for PCT/US2009/044243, mailed Nov. 23, 2010, 6 pages.
International Search Report for Application No. PCT/US2009/044243, mailed Dec. 29, 2009, 3 pages.
International Search Report for Application No. PCT/US2010/023942, Oct. 12, 2010, 4 pages.
Written Opinion of the International Searching Authority for Application No. PCT/US2010/023942, Oct. 12, 2010, 6 pages.
International Preliminary Report on Patentability for Application No. PCT/US2010/023942, Aug. 16, 2011, 7 pages.
Office Action for U.S. Appl. No. 11/800,462 mailed Apr. 2, 2009, 8 pages.
Office Action for U.S. Appl. No. 11/985,603 mailed Apr. 8, 2009, 5 pages.
Office Action for U.S. Appl. No. 11/985,603 mailed Nov. 20, 2009, 6 pages.
"Introduction to the SEMI 300mm Standards", Revision C, Aug. 26, 2003, pp. 1-8, Cimetrix Incorporated, Salt Lake City, Utah.
"SEMI E30.5-0302 Specification for Metrology Specific Equipment Model", www.semi.org, Dec. 2001, pp. 1-33.
"SEMI E40-0705 Standard for Processing Management", www.semi.org, Jun. 2005, pp. 1-25.
"SEMI E94.1-1101 Specification for SECS-II Protocol for Control Job Management (CJM)", www.semi.org, Sep. 2001, pp. 1-6.
"SEMI E94-0302 Provisional Specification for Control Job Management", www.semi.org, Dec. 2001, pp. 1-21.
Moyne, James, "Glossary of SEMI Standards: Current and Pending", Nov. 1998, University of Michigan, MiTex Solutions, Inc., http://www.integratedmeasurement.org/standards/stand03.htm, pp. 1-3.
Ogawa, Masatoshi, et al., "Development of Sequential Prediction System for Large Scale Database-based Online Modeling", *International Conference on Control, Automation and Systems,* Oct. 17-20, 2007, Seoul, Korea; 4 pages.

\* cited by examiner

| | A | B | C | D | E |
|---|---|---|---|---|---|
| 1 | PECZ41 | | | | |
| 2 | | | | | |
| 3 | #EventID | Severity | Source | Creation Time | Text |
| 4 | 61 | Trace (8) | AT/CHA | 01:25.3 | Clean recipe P Idle C 400C started. |
| 5 | 37 | Trace (8) | AT/System | 01:25.3 | CHA/Clean/Idle Purge.AccmRcpCnt changed from 4903 to 4904 |
| 6 | 37 | Trace (8) | AT/System | 01:25.3 | CHA/Clean/Idle Purge.CurRcpCnt changed from 9622 to 9623 |
| 7 | 229 | Trace (8) | AT/CHA | 01:26.0 | Recipe step X started |
| 8 | 230 | Trace (8) | AT/CHA | 01:41.0 | Recipe step X completed |
| 9 | 229 | Trace (8) | AT/CHA | 01:41.5 | Recipe step Y started |
| 10 | 61 | Trace (8) | AT/CHB | 01:55.7 | Clean recipe P Idle C 400C started. |
| 11 | 37 | Trace (8) | AT/System | 01:55.7 | CHB/Clean/Idle Purge.AccmRcpCnt changed from 2253 to 2254 |
| 12 | 37 | Trace (8) | AT/System | 01:55.7 | CHB/Clean/Idle Purge.CurRcpCnt changed from 9822 to 9823 |
| 13 | 229 | Trace (8) | AT/CHB | 01:56.5 | Recipe step X started |
| 14 | 230 | Trace (8) | AT/CHA | 01:56.5 | Recipe step Y completed |
| 15 | 229 | Trace (8) | AT/CHA | 01:57.4 | Recipe step X started |
| 16 | 230 | Trace (8) | AT/CHB | 02:11.4 | Recipe step X completed |
| 17 | 229 | Trace (8) | AT/CHB | 02:11.9 | Recipe step Y started |
| 18 | 230 | Trace (8) | AT/CHA | 02:12.3 | Recipe step X completed |
| 19 | 229 | Trace (8) | AT/CHA | 02:12.8 | Recipe step Y started |
| 20 | 230 | Trace (8) | AT/CHB | 02:26.9 | Recipe step Y completed |
| 21 | 229 | Trace (8) | AT/CHB | 02:27.4 | Recipe step X started |
| 22 | 230 | Trace (8) | AT/CHA | 02:27.8 | Recipe step Y completed |
| 23 | 229 | Trace (8) | AT/CHA | 02:28.6 | Recipe step X started |
| 24 | 230 | Trace (8) | AT/CHB | 02:42.4 | Recipe step X completed |
| 25 | 229 | Trace (8) | AT/CHB | 02:42.9 | Recipe step Y started |
| 26 | 230 | Trace (8) | AT/CHA | 02:43.6 | Recipe step X completed |
| 27 | 229 | Trace (8) | AT/CHA | 02:44.1 | Recipe step Y started |
| 28 | 230 | Trace (8) | AT/CHB | 02:57.9 | Recipe step Y completed |
| 29 | 229 | Trace (8) | AT/CHB | 02:58.4 | Recipe step X started |
| 30 | 230 | Trace (8) | AT/CHA | 02:59.1 | Recipe step Y completed |
| 31 | 229 | Trace (8) | AT/CHA | 02:59.5 | Recipe step Z started |
| 32 | 230 | Trace (8) | AT/CHB | 03:13.4 | Recipe step X completed |

Events_414089_from_2007-12-06_0

FIG. 5

| | A | B | C | D | E |
|---|---|---|---|---|---|
| 1 | PEC241 | | | | |
| 2 | | | | | |
| 3 | #EventID | Severity | Source | Creation Time | Text |
| 4 | 61 | Trace (8) | AT/CHA | 01:25.3 | Clean recipe P Idle C 400C started. |
| 5 | 37 | Trace (8) | AT/System | 01:25.3 | CHA/Clean/Idle Purge.AccmRepCnt changed from 4903 to 4904 |
| 6 | 37 | Trace (8) | AT/System | 01:25.3 | CHA/Clean/Idle Purge.CurRepCnt changed from 9622 to 9623 |
| 7 | 229 | Trace (8) | AT/CHA | 01:26.0 | Recipe step X started —1003 |
| 8 | 230 | Trace (8) | AT/CHA | 01:41.0 | Recipe step X completed |
| 9 | 229 | Trace (8) | AT/CHA | 01:41.5 | Recipe step Y started —1005 |
| 10 | 61 | Trace (8) | AT/CHB | 01:55.7 | Clean recipe P Idle C 400C started. |
| 11 | 37 | Trace (8) | AT/System | 01:55.7 | CHB/Clean/Idle Purge.AccmRepCnt changed from 2253 to 2254 |
| 12 | 37 | Trace (8) | AT/System | 01:55.7 | CHB/Clean/Idle Purge.CurRepCnt changed from 9822 to 9823 |
| 13 | 229 | Trace (8) | AT/CHB | 01:56.5 | Recipe step X started |
| 14 | 230 | Trace (8) | AT/CHA | 01:56.5 | Recipe step Y completed |
| 15 | 229 | Trace (8) | AT/CHA | 01:57.4 | Recipe step X started —1007 |
| 16 | 230 | Trace (8) | AT/CHB | 02:11.4 | Recipe step X completed |
| 17 | 229 | Trace (8) | AT/CHB | 02:11.9 | Recipe step Y started |
| 18 | 230 | Trace (8) | AT/CHA | 02:12.3 | Recipe step X completed —1009 |
| 19 | 229 | Trace (8) | AT/CHA | 02:12.8 | Recipe step Y started |
| 20 | 230 | Trace (8) | AT/CHB | 02:26.9 | Recipe step Y completed |
| 21 | 229 | Trace (8) | AT/CHB | 02:27.4 | Recipe step X started |
| 22 | 230 | Trace (8) | AT/CHA | 02:27.8 | Recipe step Y completed |
| 23 | 229 | Trace (8) | AT/CHA | 02:28.6 | Recipe step X started —1011 |
| 24 | 230 | Trace (8) | AT/CHB | 02:42.4 | Recipe step X completed |
| 25 | 229 | Trace (8) | AT/CHB | 02:42.9 | Recipe step Y started |
| 26 | 230 | Trace (8) | AT/CHA | 02:43.6 | Recipe step X completed —1013 |
| 27 | 229 | Trace (8) | AT/CHA | 02:44.1 | Recipe step Y started |
| 28 | 230 | Trace (8) | AT/CHB | 02:57.9 | Recipe step Y completed |
| 29 | 229 | Trace (8) | AT/CHB | 02:58.4 | Recipe step X started |
| 30 | 230 | Trace (8) | AT/CHA | 02:59.1 | Recipe step Y completed |
| 31 | 229 | Trace (8) | AT/CHA | 02:59.5 | Recipe step X started |
| 32 | 230 | Trace (8) | AT/CHB | 03:13.4 | Recipe step X completed |

Events 414089 from 2007-12-06_0

FIG. 10

Events Grid From 06/12/07 To 31/12/07 — 1500

| EventID | ToolID | Stamp Time | Source | Severity | Text | MTBI | Log |
|---|---|---|---|---|---|---|---|
| 3175 | TOOL 5-CHB | 06/12/2007 16: | AT/CHB/Inltk | 2 | Heater 2 turned | ☑ | |
| 3276 | TOOL 5-CHB | 06/12/2007 17: | AT/CHB/Inltk | 2 | Gas off due to li | ☑ | |
| 1013 | TOOL 5-CHB | 06/12/2007 19: | AT/CHB/Gaspan | 2 | Lost connection. | ☑ | |
| 3010 | TOOL 5-CHB | 06/12/2007 21: | AT/CHB/Heater/ | 2 | Watlow96 fault d | ☑ | |
| 3276 | TOOL 5-CHB | 08/12/2007 21: | AT/CHB/Inltk | 2 | Gas off due to li | ☑ | |
| 3275 | TOOL 5-CHB | 12/12/2007 12: | AT/CHB/Inltk | 2 | Iso valve closed | ☑ | |
| 3276 | TOOL 5-CHB | 12/12/2007 16: | AT/CHB/Inltk | 2 | Gas off due to li | ☑ | |
| 1013 | TOOL 5-CHB | 12/12/2007 17: | AT/CHB/Gaspan | 2 | Lost connection | ☑ | |
| 34 | TOOL 5-CHB | 12/12/2007 19: | AT/CHB/Heater/ | 2 | Set Stop Scan f | ☑ | |

FIG. 15

SOFTWARE APPLICATION TO ANALYZE EVENT LOG AND CHART TOOL FAIL RATE AS FUNCTION OF CHAMBER AND RECIPE

RELATED APPLICATION

This application claims the benefit of U.S. Provisional Patent Application Ser. No. 61/128,265, filed May 19, 2008.

TECHNICAL FIELD

Embodiments of the present invention relate to event log data analysis and more specifically to calculating a fail rate as a function of a tool and process recipe and graphically illustrating fault-related events.

BACKGROUND OF THE INVENTION

Present-day wafer processing often requires chemical reactions that take place in process chambers. The process chambers are a vacuum environment where intended chemical reactions occur under controlled conditions. Process chambers have many functions: controlling how gas chemicals flow into and react in the chamber in close proximity to the wafer; maintaining a prescribed pressure inside the vacuum environment; removing undesirable moisture, air, and reaction by-products; creating an environment for chemical reactions such as plasma to occur; and controlling the heating and cooling of the wafer.

Wafer manufacturing environments may include processing tools that are clustered as one main traffic chamber with a number of process chambers. Each of the process chambers may run the same wafer process (recipe) in parallel to improve the manufacturing throughput. Alternatively, each of the chambers may run different wafer recipes in sequential order. Processing tools are constantly generating events recorded by an event log. Each tool generates an event log that records an extensive amount of event data such as alarms (e.g., to stop a process), warnings (e.g., approaching sensors, limits), or traces (e.g., indicating the occurrence of an activity and/or type or activity). When a fault or alarm occurs on a tool, it may not be readily known whether the cause of the fault or alarm is due to the hardware (i.e., the tool or tool component) running a process recipe or due to the wafer process recipe itself.

Process engineers working on the recipe process and equipment support or tool support engineers working on the hardware must manually analyze event logs to reach a determination of the cause of the fault or alarm. However, such an analysis has proven to be both labor intensive and error prone, resulting in an inefficient use of tool event logs.

BRIEF DESCRIPTION OF THE DRAWINGS

The present invention is illustrated by way of example, and not by way of limitation, in the figures of the accompanying drawings and in which:

FIG. 5 illustrates an exemplary event log generated in accordance with one embodiment of the invention;

FIG. 10 illustrates an exemplary event log used to define each duration of performing a recipe on a particular hardware, in accordance with one embodiment of the invention;

FIG. 15 illustrates an exemplary GUI to display detailed information for qualified alarms reported for a hardware-recipe pair, in accordance with one embodiment of the invention.

DETAILED DESCRIPTION

Figures 1A, 1B:
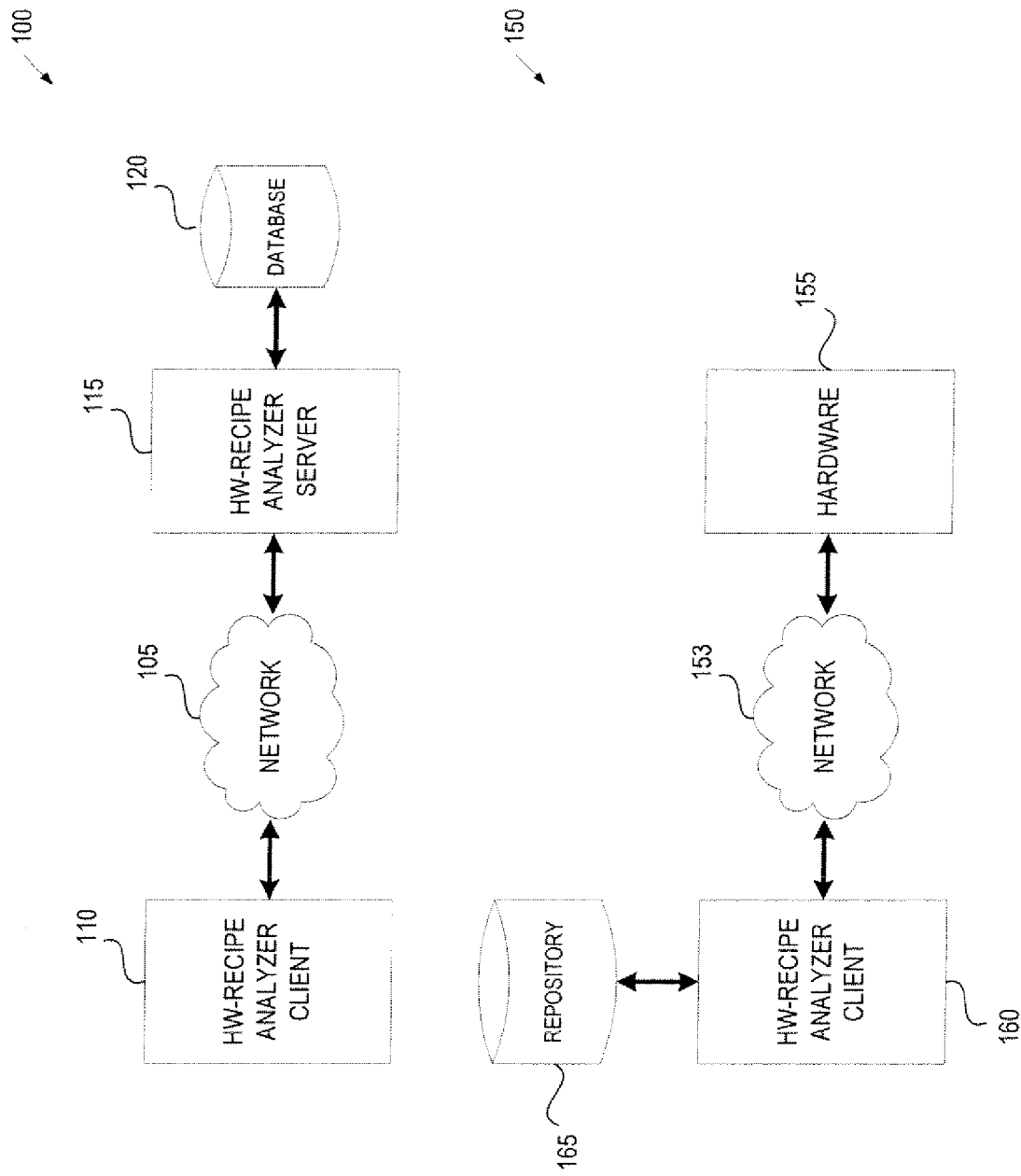
FIG. 1A illustrates an exemplary network architecture on which embodiments of the present invention may be implemented.
FIG. 1B illustrates another exemplary network architecture on which embodiments of the present invention may be implemented.

Embodiments of the invention provide a method and apparatus to analyze fault-related events reported in a tool event log and provide a user interface to graphically illustrate fault-related events. When production tools fail, it is desirable to know whether a failure(s) is due primarily to hardware issues (e.g., a pump failure) or due to process issues (e.g., recipe issues, such as a wafer vacuum chucking failure due to bowing of wafer because of deposited film stress). Embodiments of the invention apply statistical analysis to the tools event logs, and graphically represent the dependence of fail rate on the tool and/or the recipe. As will be discussed in more detail below, GUIs may be provided to indicate the cause of the fault-related events (e.g., whether the fault-related events are caused by hardware issues or process issues).

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the method steps. The structure for a variety of these systems will appear from the description below. In addition, the present invention is not described with reference to any particular programming language. It will be appreciated that a variety of programming languages may be used to implement the teachings of embodiments of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1A illustrates an exemplary network architecture 100 on which embodiments of the present invention may be implemented. This example uses a client-server architecture. Hardware-recipe analyzer client 110 communicates over network 105 to hardware-recipe analyzer server 115. Database 120 stores event logs for one or more manufacturing process tools (not shown). FIG. 1A illustrates an example of operation in "online" mode, where hardware-recipe analyzer client 110 can connect with a central server, such as hardware-analyzer server 115, to access event logs stored on database 120. Such client based implementation provides tight authentication control.

FIG. 1B illustrates another exemplary network architecture 150 on which embodiments of the present invention may be implemented. In this example, hardware-recipe client 160 communicates over network 153 with hardware 155, such as one or more processing tools or components of processing tools, to receive event logs generated by the hardware. Hardware-recipe client 160 can store the event logs in repository 165 hosted by a local or remote data storage device. Network architecture 150 may be an example of hardware-recipe client 160 operating in an "offline" mode using locally stored event logs. In yet another example (not shown), server 115 may perform functionality of client 110 and allow a browser to render GUIs generated by server 115.

Figure 2:
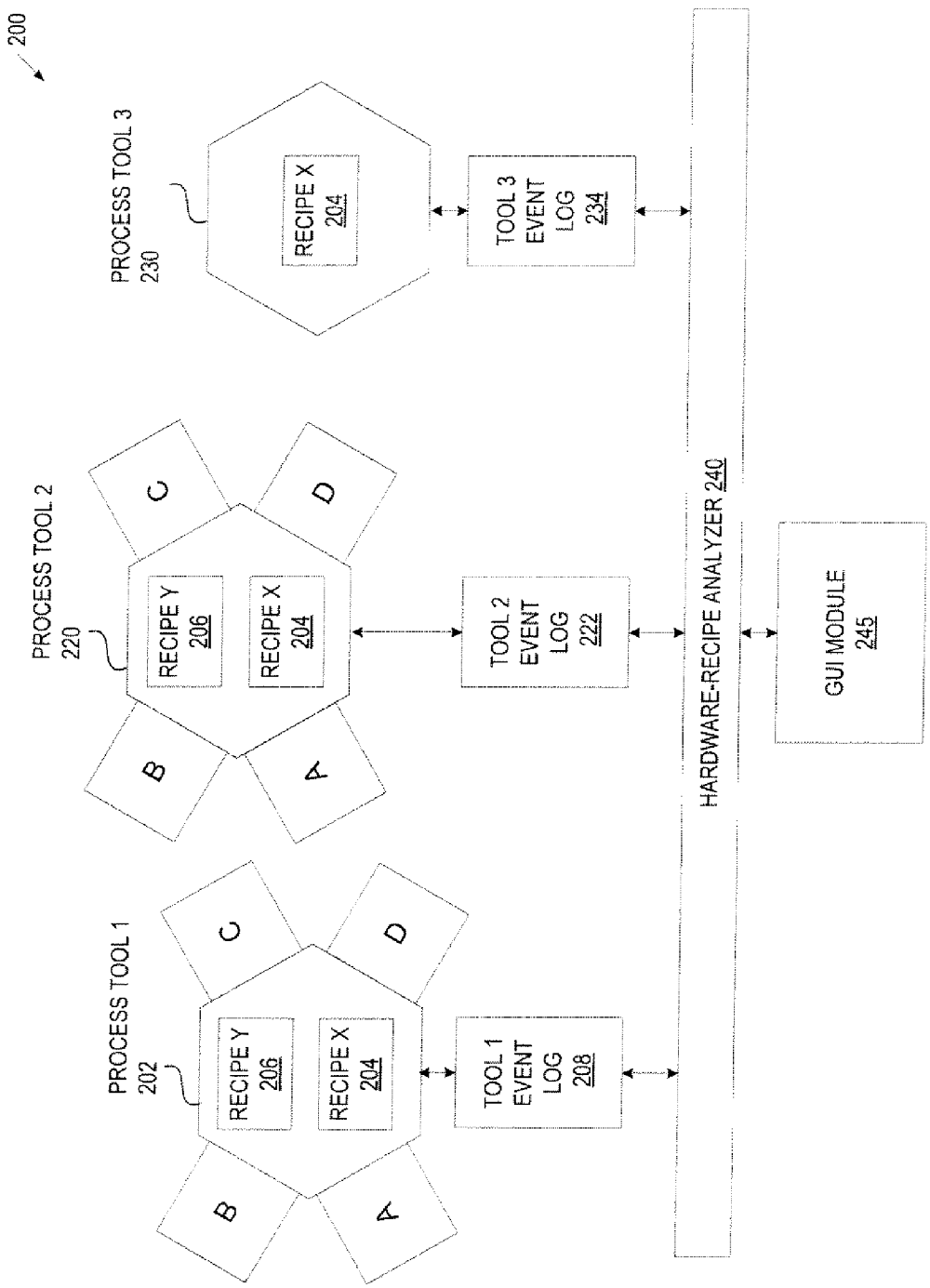
FIG. 2 illustrates an embodiment of a hardware-recipe analysis system.

FIG. 2 illustrates one embodiment of a hardware-recipe analysis system 200. System 200 may include hardware-recipe analyzer 240 and graphical user interface module 245. Hardware-recipe analyzer 240 may reside on a server (e.g., server 115 in FIG. 1A) or a client (e.g., client 160 in FIG. 1B). GUI module 245 may reside on a client (e.g., client 110 in FIG. 1A and client 160 in FIG. 1B) or a server, and generate GUIs accessible via the client's browser.

A wafer manufacturing site may include processing tools that are clustered tools. For example, a processing tool may have tool components, such as one main transfer chamber and a few process chambers. Alternatively, a process tool may not have more than one cluster. For example, process tool 1 (202) and process tool 2 (220) are clustered tools, and process tool 3 (230) is not a clustered tool. Process tool 1 (202) has four process chambers, A, B, C, and D. Therefore, hardware may be referring to an entire processing tool (e.g., process tool 1, process tool 2, process tool 3) or a tool component on a particular process tool (e.g., chamber A of process tool 1).

On clustered process tools, chambers may be configured to run one of a variety of process recipes either in parallel or in sequential order. In order to attain a higher throughput in manufacturing wafers, these process chambers can be configured to run the same process in parallel. For example, chambers A and B on process tool 1 (202) may be configured to simultaneously run RECIPE X (204). Alternatively, the chambers may be configured to run different processes such that a wafer would be processed through the chambers sequentially. Chamber A may be configured to run RECIPE X (204) and chamber B may be configured to run RECIPE Y (206) in sequential order. For example, chamber A may be configured for a pre-clean and chamber B may be configured to do a deposition, etc.

Process tools 1, 2, and 3 may each be configured to run RECIPE X (204). A process tool may also be configured to run a recipe more than once. For example, process tool 2 (220) may run RECIPE X (204) multiple times. Each process tool may run more than one recipe. For example, process tool 1 (202) and process tool 2 (220) can run RECIPE X (204) and RECIPE Y (206).

Each process tool generates an event log recording the activity (e.g., event data) for the process tool, including the activity of each tool component. An event log may include event data pertaining to running a recipe on the hardware (e.g., the entire process tool or each tool component, such as a chamber). For example, process tool 1 (202) may generate event log 208, process tool 2 (220) may generate event log 222, and process tool 3 (230) may generate event log 234. Using the above example where process tool 1 (202) is configured to run RECIPE X (204) on chamber A and chamber B, tool 1 event log (208) may record the activity of running RECIPE X (204) on chambers A and B. Event logs may be stored in a database (e.g., a database coupled to a hardware-recipe analyzer server) or in a repository hosted by a local or remote data storage device.

Hardware-recipe analyzer 240 may use tool event logs (e.g., 208, 222, and 234) generated by each process tool to analyze the event data and calculate, for example, a fail rate for running a particular recipe on a particular hardware (e.g., chamber). Fail rate represents the number of qualified alarms reported in relation to a total number of runs of a recipe on a particular hardware. Fail rate will be discussed in further detail below in conjunction with FIG. 6. Hardware-recipe analyzer 240 may also use event logs to calculate a fail count for each recipe run on a particular hardware. Fail count represents the number of qualifed alarms reported for running a recipe on a particular hardware. Fail count will be discussed in further detail below in conjunction with FIG. 6. Hardware-recipe analyzer 240 may provide the fault-related event data to GUI module 245.

GUI module 245 may generate a GUI to present fault-related event data received from hardware-recipe analyzer 240. GUI module 245 may generate a GUI to graphically indicate whether the fault-related events were caused by the hardware or by a recipe performed on the hardware. GUI module 245 may also generate GUIs to manage event data to be analyzed.

Figure 3A:
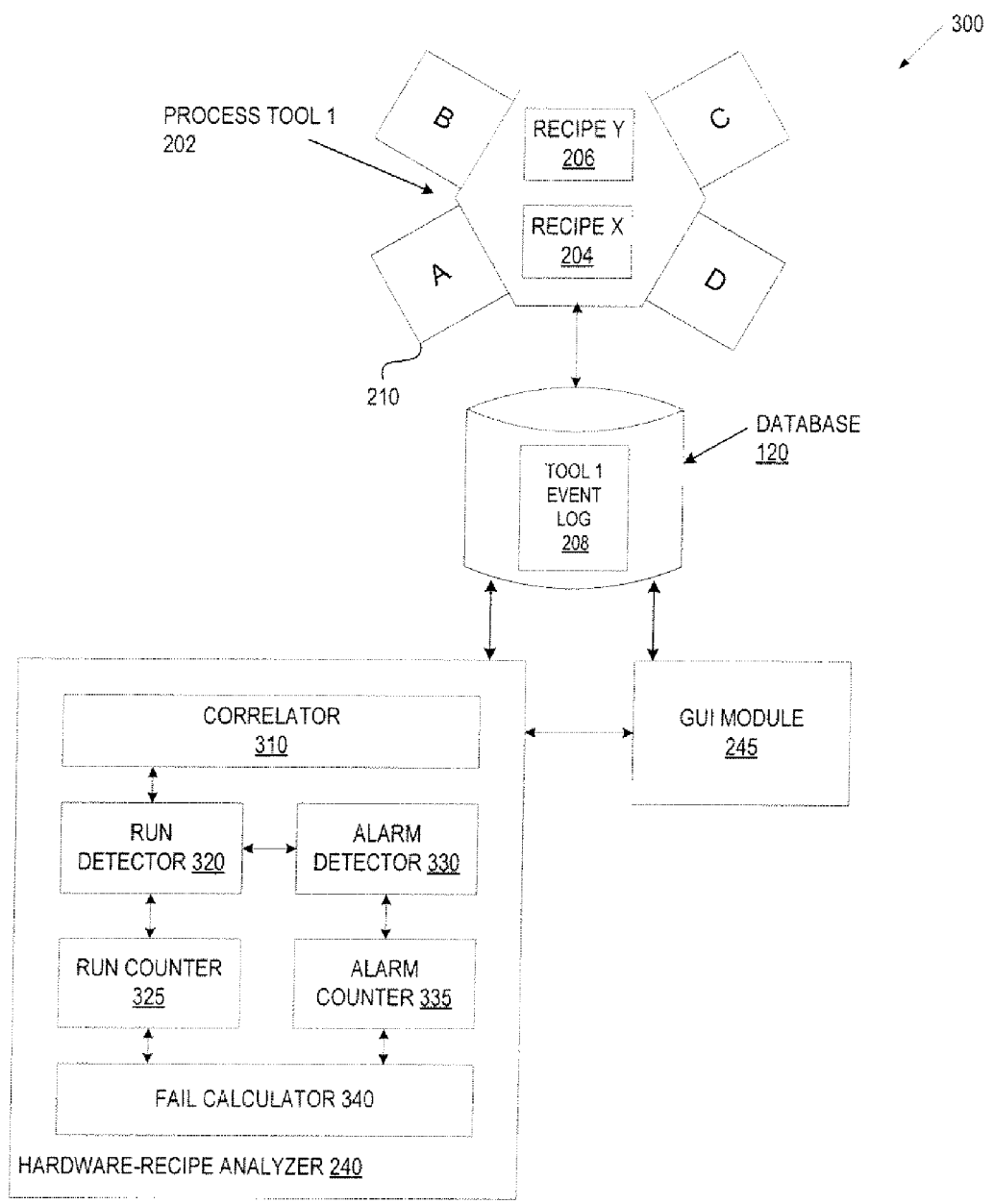
FIG. 3A illustrates an embodiment of a hardware-recipe analyzer.

FIG. 3A illustrates one embodiment of hardware-recipe analyzer 240 in a hardware-recipe analysis system 300. Hardware-recipe analyzer 240 may include correlator 310, run detector 320, run counter 325, alarm detector 330, alarm counter 335 and fail calculator 340. Hardware-recipe analyzer 240 may event an event log 208 for a manufacturing process tool. Event log 280 may be stored in database 120.

Correlator 310 may use event log 208 to identify various hardware-recipe pairings, such as a ToolChamber-Recipe pair. In other words, correlator 310 can identify, for each tool, which recipes are run on which chambers. For example, correlator 310 can correlate RECIPE X (204) with chamber A (210) on process tool 1 (202), thus identifying a "TOOL1CHA-RECIPE X" pair.

Run detector 320 collects run time data for each time a recipe is run on a particular hardware (e.g., an entire tool, a chamber on a specific tool). Run detector 320 may identify start time and complete time for each run of a recipe for a particular hardware-recipe pair. For example, for the hardware-recipe pair "TOOL1CHA-RECIPE X,", run detector 320 may identify that RECIPE X has a start time A, complete time A, start time B, complete time B, and start time C, and complete time C.

Run counter 6325 may use the run time data collected by run detector 310 to keep track of the number of times a recipe is run on a specific hardware. Using the previous example, run counter 325 can count that RECIPE X is run at least three times on TOOL1CHA (e.g., Run 1 is defined from start time A and complete time A, Run 2 is defined from start time B and complete time B, and Run 3 is defined from start time C and complete time C).

Alarm detector 330 may use run time data collected by run detector 310 to detect whether a qualified alarm has been reported by a tool or tool component (e.g., chamber) during a run of a recipe on hardware. Events may be characterized, for example, as alarms, warnings, and traces. A majority of events that are logged in an event log are characterized as traces. Traces capture what activity is occurring (e.g., a system is idle for the cleaning, a process tool door is open, a robot is moving, a wafer is transferred, a recipe is started, a recipe is completed, etc.). Qualified alarms may not include all reported events. For example, since traces capture activity such as a process door is open or a robot is moving, qualified alarms may not include events characterized as traces. On the other hand, qualified alarms may include events characterized as alarms and warnings. Alarm counter 335 may use the data from alarm detector 330 to keep track of the number qualified alarms reported while running a particular recipe on a particular hardware.

Hardware-recipe analyzer 240 may include fail calculator 340 to make failure related calculations for running a particular recipe on a particular hardware. Fail calculator 340 may use data from run counter 325 and alarm counter 335 to calculate a fail rate. Fail calculator 340 may use data from run counter 325 and alarm counter 335 to determine a fail count. Hardware-recipe analyzer 240 may store data collected and calculated in a database (e.g., a database coupled to a hardware-recipe analyzer server) or in a repository hosted by a local or remote data storage device.

Figure 3B:
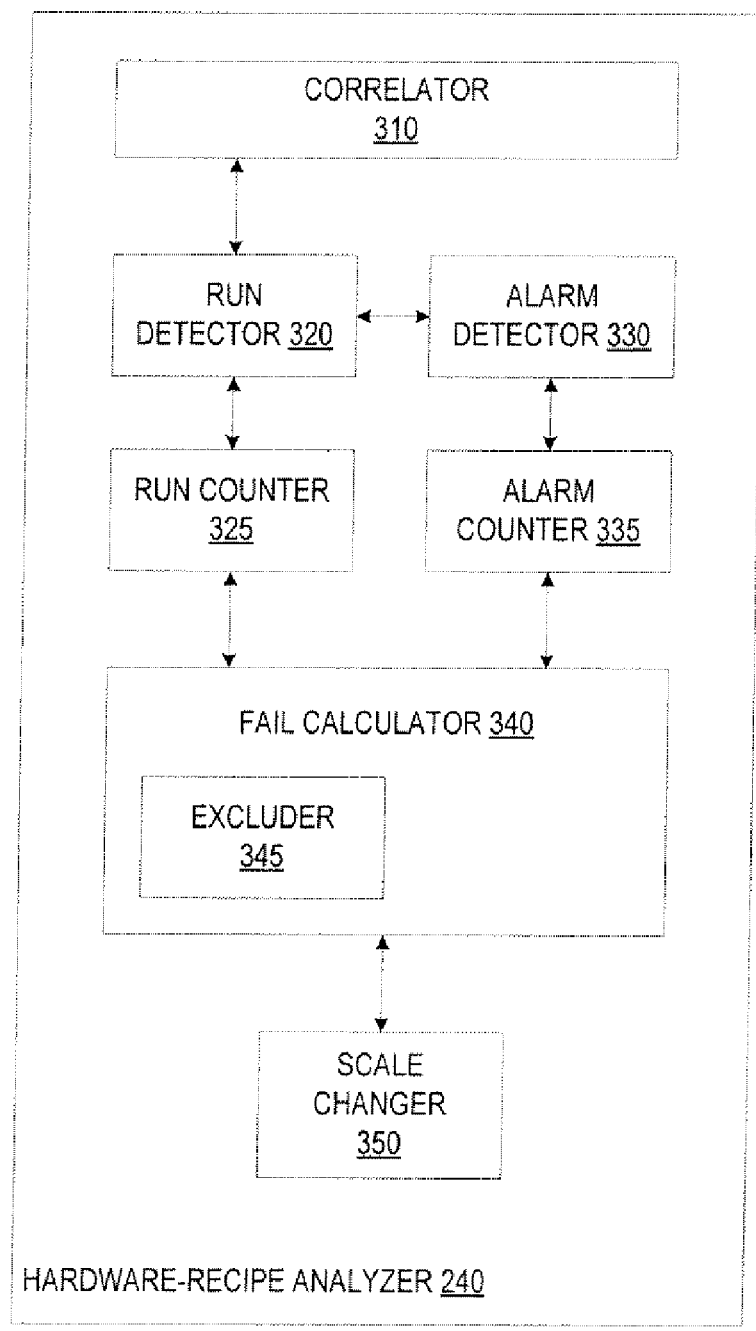
FIG. 3B illustrates another embodiment of a hardware-recipe analyzer.

FIG. 3B illustrates another embodiment of tool-recipe analyzer 240. Hardware-recipe analyzer 240 may include excluder 345 and scale changer 350. Excluder 345 excludes event log data, for example, based on a user input, in calculating a fail rate or fail count for running a particular recipe on a particular hardware. For example, a user may exclude event log data for a particular hardware-recipe pair because it may be suspected as or identified as an outlier. It may be known that a particular hardware requires maintenance or maintenance was just performed. In such cases, the data for that particular hardware may be excluded from calculations since including such data would result in calculations which would not be reflective of normal operating circumstances.

Scale changer 350 may change the graphical user interface to present different fault-related events. In one embodiment scale changer 305 toggles the presentation of the fault-related events between fail rate and fail count. The scale may be changed from fail rate to fail count, based on a user input.

Figure 4:
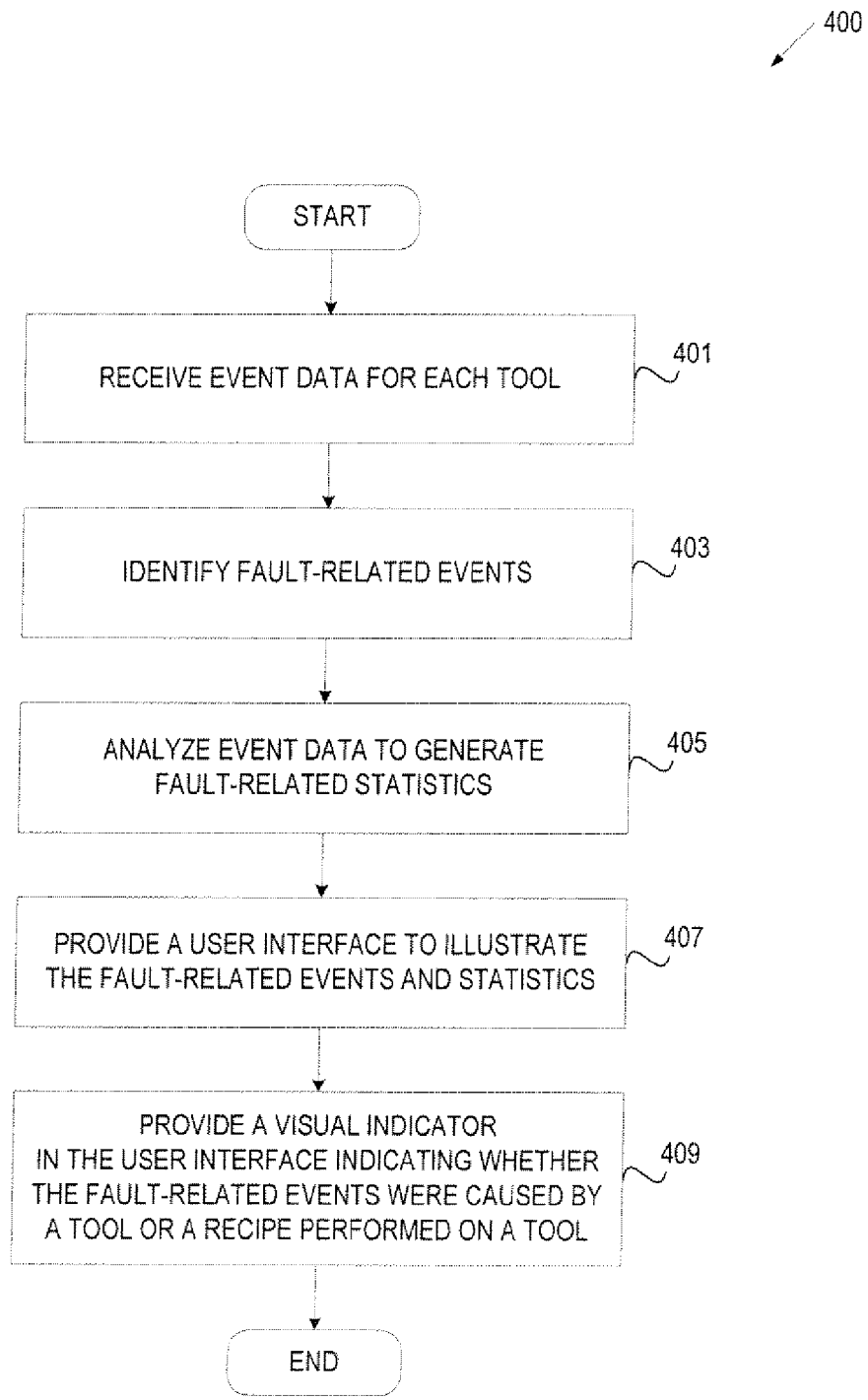
FIG. 4 illustrates one embodiment of a method for presenting hardware-recipe fault-related event data.

FIG. 4 illustrates one embodiment of a method 400 for graphically indicating whether fault-related events are caused by a manufacturing process hardware tool or a recipe performed on the manufacturing process hardware tool. The method may be performed by processing logic that may comprise hardware (e.g., circuitry, dedicated logic, programmable logic, microcode, etc.), software (such as instructions run on a processing device), or a combination thereof. In one embodiment, method 400 is performed by the hardware-recipe analysis system 300 of FIG. 3A.

At block 401, event data is received for each manufacturing process hardware tool. In one embodiment, an event log is received for each process tool. As discussed above, an event log is a log of the activity of a process tool, which may include the activity of each tool component. An event log may be exported from a process tool and received at block 401. Alternatively, where there is a remote connection to the process tool, an event log may be remotely and automatically scheduled for retrieval. Event logs may be stored in a database (e.g., a database coupled to a hardware-recipe analyzer server) or in a repository hosted by a local or remote data storage device. FIG. 5 illustrates an exemplary process tool event log 500 generated in accordance with one embodiment of the invention. Event log 500 illustrates a process tool that has two chambers, chamber A (as indicated by the source at 502) and chamber B (as indicated the source at 560). An event is an activity occurring on, or related to, the hardware. In this example, each row of event log 500 represents a recorded event.

Event log 500 may include event ID 504, severity 506, source 508, creation time 510 and text 512. Event ID 504 is an event code assigned to a specific event. There may be thousands of event IDs to describe all known possible events. Text 512 may correspond to each Event ID 504 to provide a description of the event (activity) occurring. For example, event log 500 illustrates that text 516 describes Event ID 229 (514) as starting a recipe.

Severity 506 is a characteristic of an event. Events may be characterized, for example, as alarms, warnings, and traces. An alarm may indicate a failure. For example, an alarm may have a severity level of 1 or 2 depending on whether an alarm may stop a process or may not stop a process. Examples of level 1 and level 2 alarms are safety alarms and fatal alarms. Warnings are a type of lower level alarm. Warnings may have severity levels of 3, 4, 5, or 6. An example of a warning is a notification that a threshold is approaching. For example, a sensor may be approaching a limit in terms of its lifespan and a lower level alarm (i.e., a warning) may be reported. A majority of the events recorded in an event log are traces. Traces capture what activity is occurring (e.g., a system is idle for the cleaning; a process tool door is open, a robot is moving, a wafer is transferred, a recipe is started, a recipe is completed, etc.). Traces may have severity levels of 7 or 8. In this example, all of the events displayed in event log 500 are traces as illustrated in column B (520). In one embodiment, there are eight levels of severity. Event log 500 may display the level of severity that corresponds to an Event ID in parentheses next to the classification of the event. For example, an event of starting a recipe 516 is characterized as a trace having a severity level 8 (518).

Source 508 identifies the source reporting the specific event. A process tool may have multiple sources for reporting an event. For example, a particular tool component, such as a robot in a process tool, may have problems and thus, report an event. A process tool may also be a cluster tool and thus, have more than one source (e.g., more than one chamber) reporting an event. For example, where there is a process tool simultaneously running recipes on multiple process chambers and a problem with a pressure gauge is reported, it is helpful to identify which chamber reported the event. Creation time 510 identifies the time an event was reported by the process tool or tool component. Creation time 510 will be discussed in more detail below in conjunction with FIG. 10.

Returning to FIG. 4, at block 403, fault-related events are identified. As discussed above, an event log may record process tool activity and characterize activity as alarms, warnings, and traces. Events characterized as traces may not be included in a failure analysis. As such, at block 403, a subset of events, such as fault-related events may be identified.

Figure 6:
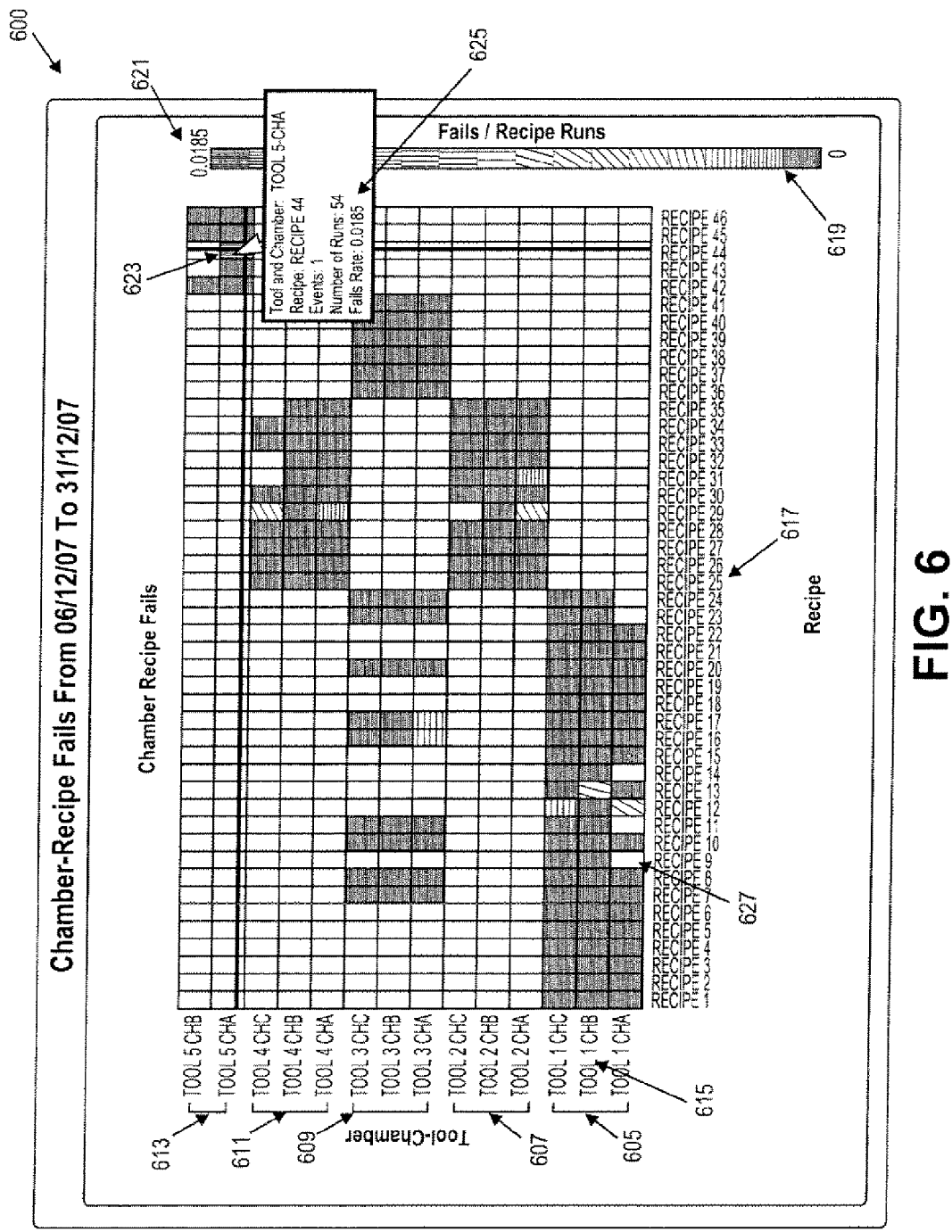
FIG. 6 illustrates an exemplary graphical user interface (GUI) to present fault-related events, in accordance with one embodiment of the invention.

At block 405, the event data is analyzed to generate fault-related statistics. Analyzing event data is discussed in more detail below in conjunction with FIG. 8A and FIG. 8B. At block 407, a user interface is provided to illustrate the fault-related events and statistics. FIG. 6 illustrates an exemplary GUI 600 to present fault-related events and statistics, in accordance with one embodiment of the invention. GUI 600 may include an x-axis and y-axis. GUI 600 may also include color to represent a third dimension. In other embodiments, a GUI may use other visual indicators (e.g., different patterns, different shading, different shapes, etc.) to represent a third dimension.

The y-axis represents hardware, for example, a manufacturing process tool and tool component. In this example, GUI 600 represents a tool and tool component using a tool ID and tool component ID. GUI 600 illustrates 5 process tools (605, 607, 609, 611, 613) each having multiple chambers (e.g., CHA, CHB, and CHC). In one embodiment a tool ID is a 6-digit ID. For illustrative purposes, GUI 600 includes a tool ID of "TOOL" with a corresponding tool number. GUI 600 includes a tool component ID of "CH" with a corresponding component identifier to identify a specific component of the tool (e.g., a specific chamber). For example, TOOL1CHB (615) represents chamber B on process tool 1.

The x-axis represents process recipes performed on the various tools and tool components. In this example, GUI 600 illustrates 46 recipes. When there are multiple tools in a fabrication plant, manufacturers may often create one recipe for use on a specific process tool and subsequently copy that recipe to other process tools that may be used for the same manufacturing purposes. For scheduling purposes, wafer lots may then be routed to any process tool that is available. For example, RECIPE 25 (617) may be performed on either of TOOL2 (607) and TOOL4 (611), and their respective chambers, as tool availability permits. The intersection of each recipe with each hardware may be a cell. Each cell presents information relating to a particular hardware-recipe pair, that is, a particular recipe performed on particular hardware. For example, cell 623 presents information for performing RECIPE 44 on TOOL5CHA.

GUI 600 is an example of a color map where color signifies a value. GUI 600 may include a color bar 619 as a visual indicator of a scale of values. In other embodiments, a GUI may use other visual indicators (e.g., different patterns, different shading, different shapes, etc.) to represent a scale values. In this example, color bar 619 is a scale where dark blue indicates a minimum value of zero and red indicates a maximum value. In one embodiment, the maximum value is a value determined by the set of data being presented. For example, GUI 600 shows a maximum value of 0.0185 (621) corresponding to a fail rate (625) for performing RECIPE 44 on TOOL5CHA. From the event data gathered for the 46 recipes and 5 process tools illustrated, the hardware-recipe pair of RECIPE 44 performed on TOOL5CHA results in the highest fail rate, as illustrated by the color red of cell 623 and the value of 0.0185 (621). As such, color bar 619 defines its maximum value as that of the fail rate for hardware-recipe pair TOOL5CHA-RECIPE 44. Color bar 702 may use the color purple to represent a middle value on the scale and the color white to indicate that a recipe was not performed on particular hardware. For example, cell 627 indicates that RECIPE 9 was not performed on TOOL1CHA.

Figure 7:
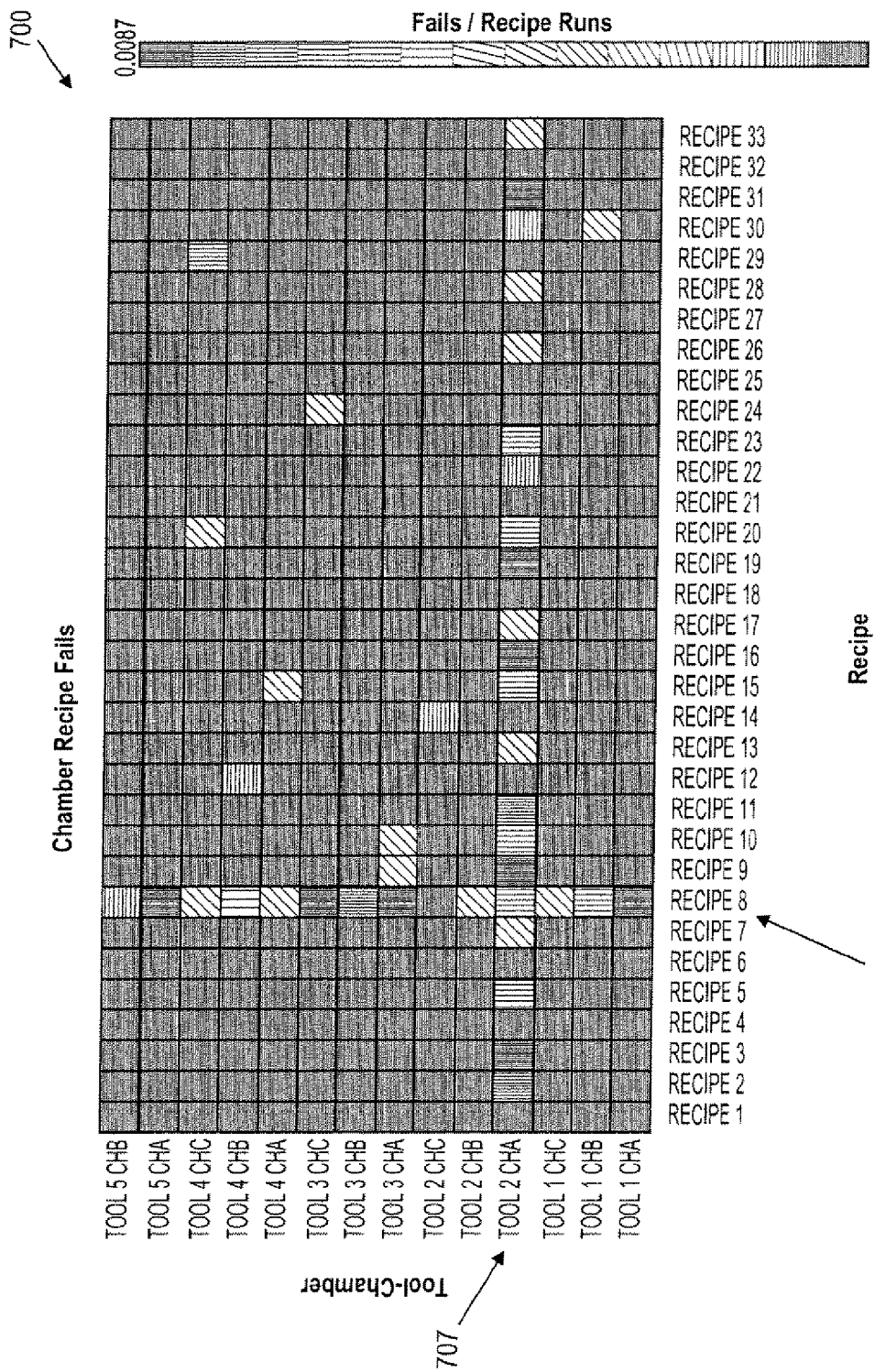
FIG. 7 illustrates an exemplary graphical user interface (GUI) to present fault-related events, in accordance with one embodiment of the invention.

Returning to FIG. 4, at block 409, a visual indicator is provided to indicate whether manufacturing process hardware caused the fault-related events or whether a recipe performed on the manufacturing process hardware caused the fault-related events. In manufacturing sites, process engineers monitor the processes used to manufacture wafers and tool support engineers (hardware or equipment support engineers) monitor the hardware used in manufacturing the wafers. When faults occur in manufacturing wafers, it is not easily known whether the faults were caused by the wafer processes (recipes) performed on hardware or whether the faults were caused by the hardware itself. Presenting fault-related information may enable process engineers and tool support engineers to separate variables and provide an indication of whether the faults are related to the processes or the hardware. When faults occur, a visual indication of fault-related events may be useful in providing process engineers and equipment support engineers an instruction of what appropriate action to take. FIG. 7 illustrates another exemplary GUI 700 to present fault-related information, according to one embodiment of the invention.

GUI 700 illustrates fault-related events for 33 recipes and 5 process tools. A number of red cells along a vertical axis (a column of cells) may indicate that faults are related to or caused by a problematic recipe. For example, GUI 700 shows a number of red cells in the column corresponding to RECIPE 8 (703). Each red cell illustrates that the fail rate of performing RECIPE 8 on a particular hardware is high. The large number of red cells corresponding to RECIPE 8 may indicate that the fail rate for performing RECIPE 8 may be high regardless of the tool and chamber used to run the recipe. A process engineer may interpret the visual indicator as identifying RECIPE 8 as a problematic recipe. As a result, a process engineer may investigate and adjust the recipe parameters for RECIPE 8.

GUI 700 may indicate by a number of red cells along a horizontal axis (a row of cells) that a particular hardware, for example, a specific tool (e.g., chamber) may be problematic hardware. For example, a number of red cells are shown along the row corresponding to TOOL2CHA (707). Regardless of which recipe is performed on TOOL2CHA, the failure rate is high (e.g., performing RECIPES 2, 3, 9, 11, 16, 19 and 31 on TOOL2CHA results in high fail rates). The visual indicator of the number of high fail rates for running different recipes on TOOL2CHA may be an indication that the hardware, that is, Chamber A of Tool 2, is problematic hardware. As a result, an equipment support engineer may calibrate the hardware.

Figure 8A:
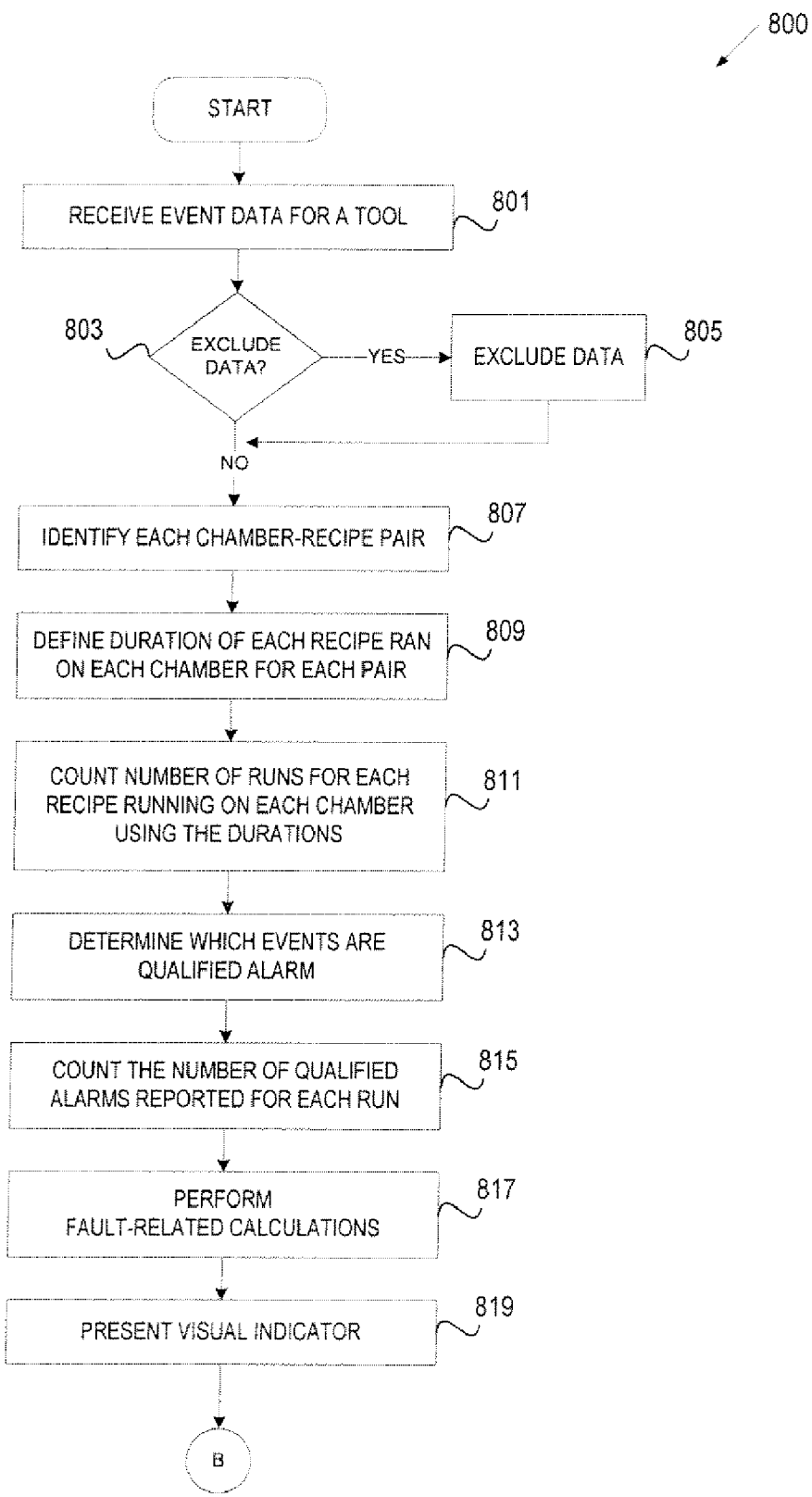
FIGS. 8A and 8B illustrate one embodiment of a method for analyzing and presenting hardware-recipe event data.
Figure 8B:
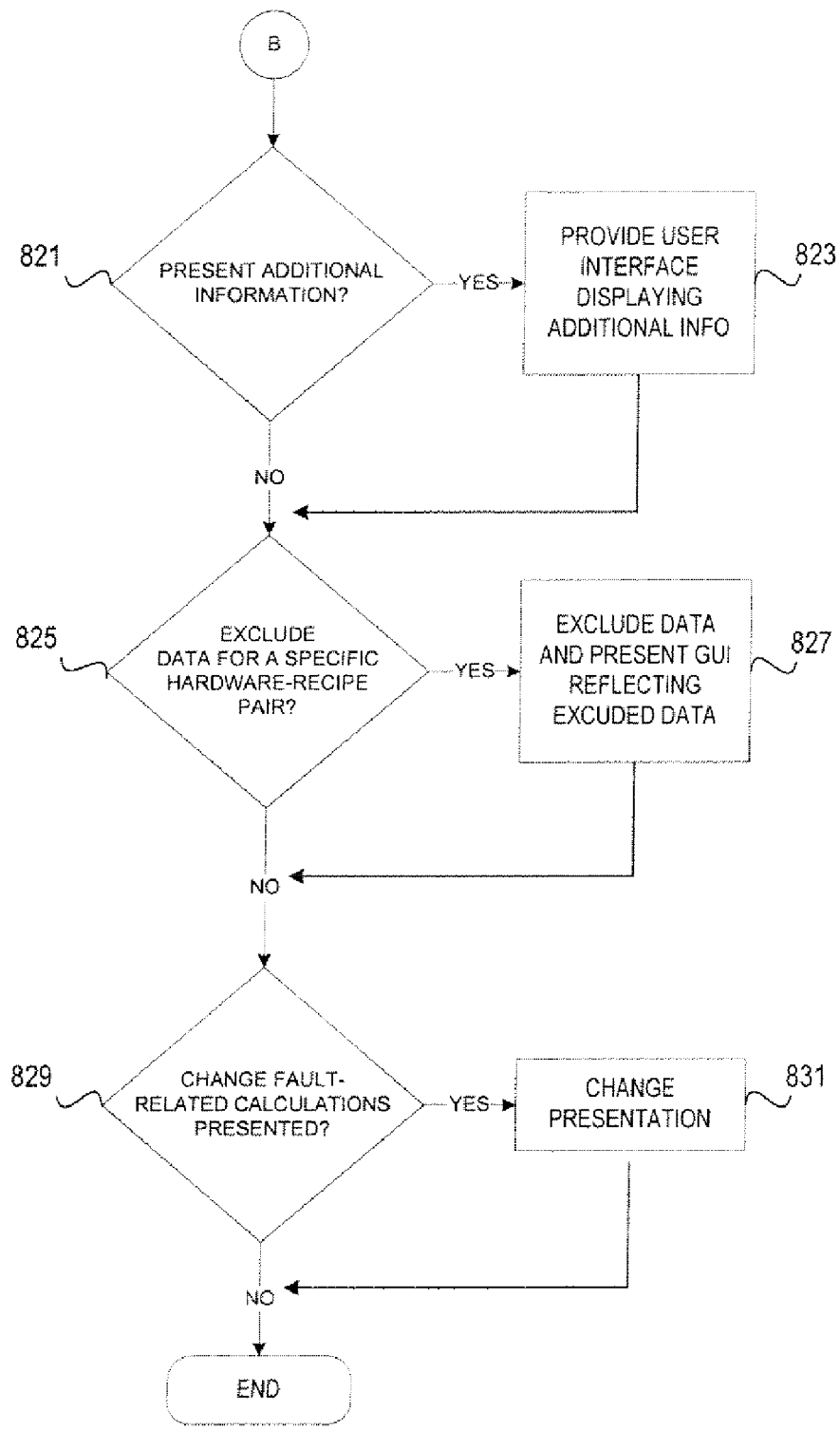

FIG. 8A and FIG. 8B illustrate one embodiment of a method for analyzing event data and presenting fault-related events. The method may be performed by processing logic that may comprise hardware (e.g., circuitry, dedicated logic, programmable logic, microcode, etc.), software (such as instructions run on a processing device), or a combination thereof. In one embodiment, method 800 is performed by the tool-recipe analysis system 300 of FIG. 3A.

Figure 9A:
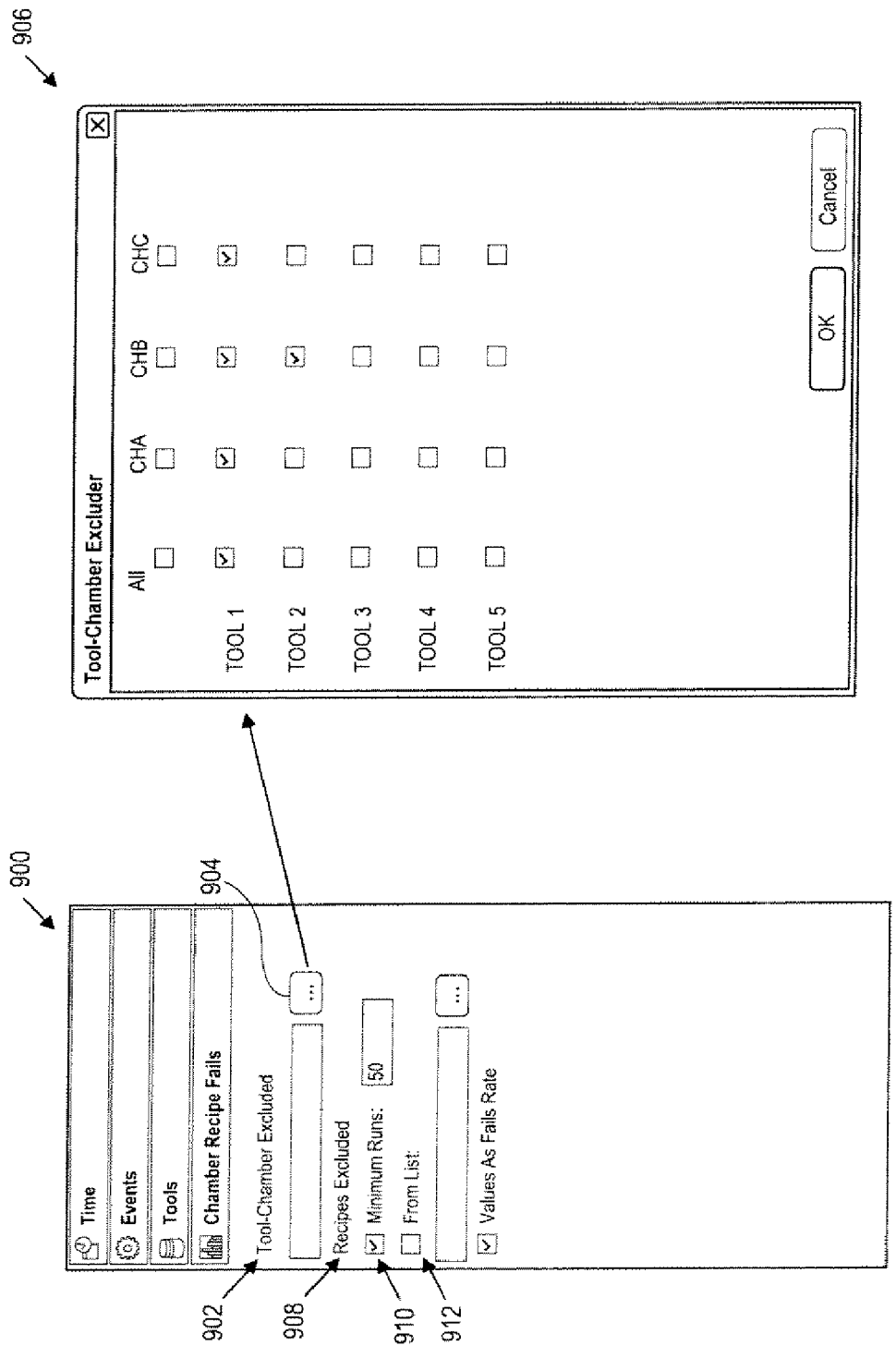
FIGS. 9A and 9B illustrate exemplary GUIs to define data to be included and excluded from a failure analysis, in accordance with one embodiment of the invention.
Figure 9B:
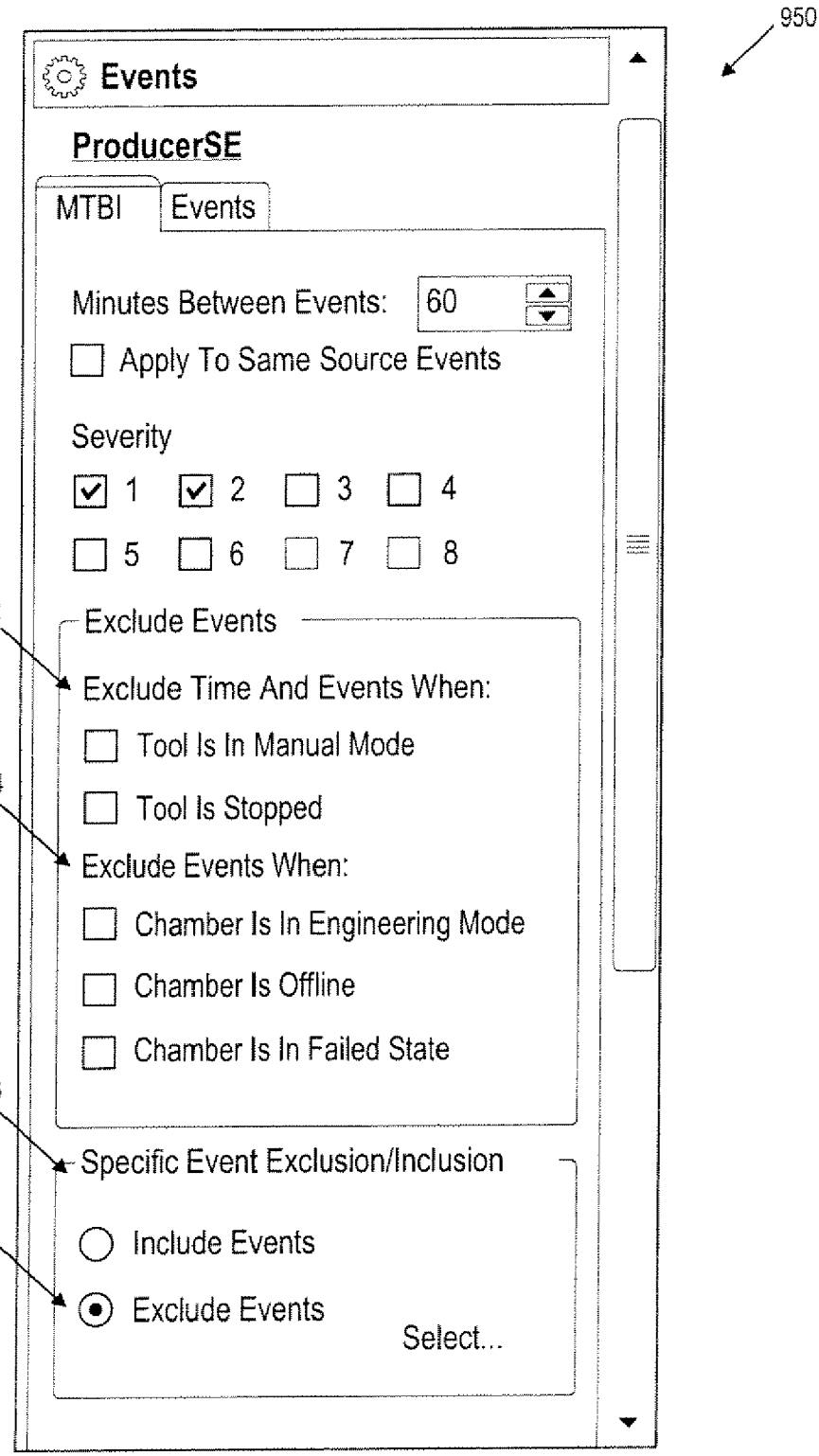

At block 801, event data for manufacturing process hardware is received. In one embodiment, event data is received as an event log generated by a process tool. At block 803, the method may determine whether data recorded for one or more hardware, one or more recipes, and one or more events is to be excluded when analyzing the data. In one embodiment, the method may determine whether to exclude data by receiving a user input via a GUI. FIG. 9A and FIG. 9B are exemplary GUIs for excluding data in accordance with one embodiment of the invention. GUI 900 illustrates that event log data pertaining to one or more tools and chambers may be excluded from an analysis. For example, GUI 900 may be used to exclude event log data for a selected tool-chamber (902). Selection of button 904 may trigger user interface 906 for excluding event log data for specific tools and chambers. As seen in GUI 906, CHA, CHB, and CHC on TOOL1 are selected for exclusion, and thus, the event log data for the entire process tool 1 is excluded. In another example, GUI 906 illustrates that the data for a single tool component, CHB on TOOL2 is excluded.

User interface 900 may also be used to exclude recipes (908). For example, a threshold may be set to define a minimum number of runs (910) a recipe may have in order to be included in a failure analysis. For example, GUI 900 illustrates that any recipes not having a minimum number of 50 runs is excluded. Alternatively, recipes may be excluded from failure analysis by selecting recipes from a list (912).

In another embodiment, events may be excluded depending on the status of the hardware. Processing tools can be in one of many modes (e.g., running, idle, manual, engineering, etc.) and the events recorded during a particular mode may not warrant analysis. FIG. 9B is an exemplary GUI 950 for excluding events in accordance with one embodiment of the invention. GUI 950 illustrates that events may be excluded when a tool is in manual mode or when a tool is stopped (952). Events may also be excluded depending on the status of a tool component (954) (e.g., chamber is in engineering mode, offline, or in a failed state). Specific events (956) may also be excluded or included in a failure analysis. For example, selection of Exclude Events (958) may exclude specific event IDs.

Returning to FIG. 8A, if, at block 803, the method determines that data is to be excluded from the analysis, the data is excluded at block 805. If, at block 803, the method determines that data is not to be excluded from the analysis, the process continues to block 807.

At block 807, event data may be used to identify each hardware-recipe pair (e.g., chamber-recipe pair). As described above, manufacturers may often create one recipe for use on a specific process tool and subsequently copy that recipe to other process tools. Wafer lots can then be routed to any process tool that is available. For example, RECIPE 25 may be copied to TOOL2 and TOOL4, and their respective chambers. For scheduling purposes, RECIPE 25 may be performed on any of the chambers on TOOL2 and any of the chambers on TOOL4, as tool availability permits. Where TOOL2 has 3 chambers (e.g., CHA, CHB, and CHC), the process may use the event log generated by TOOL2 to identify 3 hardware-recipe pairs (e.g., TOOL2CHA-RECIPE25, TOOL2CHB-RECIPE25, and TOOL2CHC-RECIPE25). Where TOOL4 has 3 chambers (e.g., CHA, CHB, and CHC), the process may use the event log generated by TOOL4 to also identify 3 hardware-recipe pairs (e.g., TOOL4CHA-RECIPE25, TOOL4CHB-RECIPE25, and TOOL4CHC-RECIPE25).

At block 809, the duration of each time a recipe is performed on a particular hardware (e.g., chamber) is defined. The duration may be defined by an identified start time and complete for each recipe performed on each tool component. FIG. 10 is an exemplary event log 1000 in accordance with one embodiment of the invention. Event log 1000 shows that the event for starting RECIPE STEP X on CHA (1003) on this particular process tool was reported at time 01:26:00. The event for completing RECIPE STEP X on CHA (1005) was reported at time 01:41:00. Thus, in this example, the duration of this particular run of RECIPE STEP X on CHA on this tool is defined as the time between start time 01:26:00 and completion time 01:41:00.

Returning to FIG. 8A, at block 811, the defined durations may be used to determine the number of runs for each recipe performed on a particular tool component (e.g., chamber). For example, in addition to a first run of RECIPE STEP X on CHA between start time 01:26:00 and completion time 01:41:00, GUI 900 shows a second run of RECIPE STEP X on CHA between start (1007) time 01:57.4 and completion (1009) time 02:12.3. Similarly, a third run of RECIPE STEP X on CHA was reported between start (1011) time 02:28.6 and completion (1013) time at 02:43.6. Using this example, at block 811, three durations (three runs) of RECIPE STEP X on CHA is counted.

Figure 11:
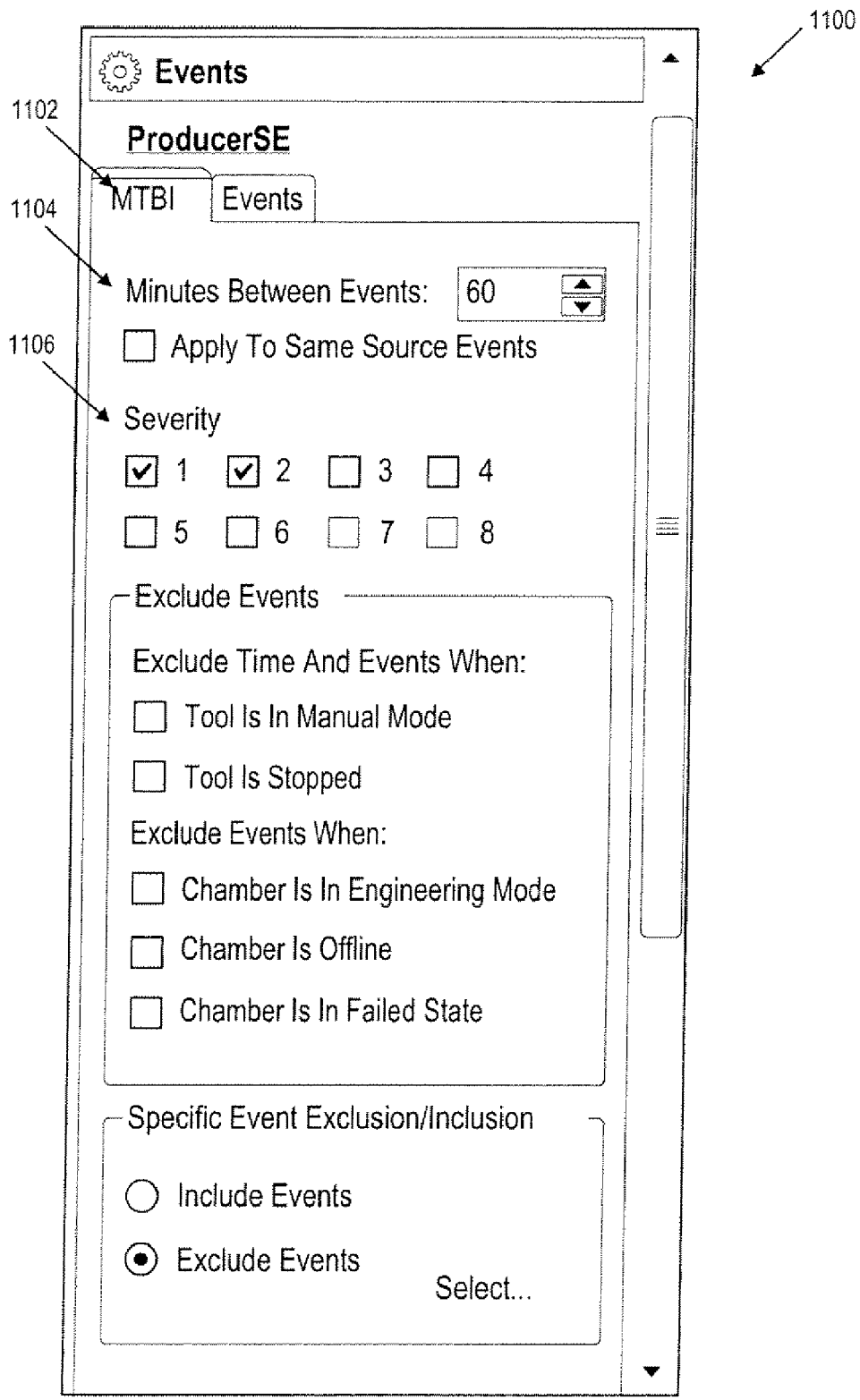
FIG. 11 illustrates an exemplary GUI to define a qualified alarm, in accordance with one embodiment of the invention.

Returning to FIG. 8A, at block 813, a determination is made as to which of the events recorded in an event log is a qualified alarm. A qualified alarm may be defined by a set of rules determined by, for example, receiving user input via a GUI. FIG. 11 illustrates an exemplary GUI 1100 to set rules for defining a qualified alarm, in accordance with one embodiment of the invention. User interface 1100 may be referred to as a filter panel.

Mean time between interrupt (MTBI) event tab 1102 may be used to define qualified alarms in a number of ways. For example, the severity level (1106) of an event may define a qualified alarm. In this example, GUI 1100 illustrates that events with a severity level of 1 or 2 are considered qualified alarms. As such, only the events with a severity of level 1 or level 2 will be used in performing a failure analysis (e.g., failure calculations, such as fail rate and fail count).

In this example, GUI 1100 also illustrates that the selection boxes for severity levels 7 and 8 are disabled indicating that these severity levels cannot define qualified alarms. As described above, severity levels 7 and 8 may correspond to traces. Traces indicate a number of different types of activities occurring (e.g., a door is open, a robot is moving, a wafer is transferred, a recipe is started, a recipe is completed, etc.). Such activity may not warrant inclusion in a failure analysis (e.g., calculating fail rate and fail count) and thus, the corresponding severity levels for traces are disabled.

Duplicate reporting of events may also not warrant inclusion in a failure analysis. In manufacturing environments, sometimes a single failure can result in a reporting of multiple alarms from different sources with the same or similar time stamps. For example, a single failure can trigger the reporting of 10 events. Since the 10 reported events may be from the same source, one alarm, rather than all 10 of the alarms may be included in the failure calculations and the other 9 alarms may be excluded. In one embodiment, duplicated events reported are excluded by time (e.g., in terms of minutes). For example, GUI 1100 shows that time between events, Minutes Between Events (1104), is set to 60 minutes. By setting the time between events to 60 minutes, any events reported from the time the first reported event was counted as an alarm and during the following 60 minutes may be excluded from an analysis, since the subsequent events may likely be reporting the same failure.

Alternatively, in some cases failures can occur with the same or similar time stamps, but are reported by different chambers that are failing at the same time, but for independent reasons. In such cases, similar time stamps can be included rather than excluded. For example, Minutes Between Events 1104 may be applied to same source events (1108), such that the events reported from the same source during the 60 minute time interval may be ignored, but events reported from different sources (e.g., TOOL1CHA and TOOL1CHC) may be included.

Returning to FIG. 8A, at block 815, the number of qualified alarms (or failures) reported for each duration of a recipe performed on a process tool is counted. As described above, a qualified alarm may be determined by a set of rules based on a user input. Using the criteria set for a qualified alarm, the method may determine the number of qualified alarms reported for each duration of a recipe performed on hardware (e.g., tool component).

At block 817, fault-related calculations may be performed for each hardware-recipe pair using the number of runs counted and the number of qualified alarms reported for each run. A fault-related calculation may be a fail count (e.g., the number of qualified alarms counted) or a fail rate. Fail rate may be calculated as the number of qualified alarms reported for performing a recipe on particular process hardware divided by the total number of runs of the recipe on a particular hardware. Fail count may be calculated as the total number of fails for running a particular recipe on a particular hardware. The event data collected and results from fault-related calculations may be stored in a database (e.g., a database coupled to a hardware-recipe analyzer server) or in a repository hosted by a local or remote data storage device.

At block 819, a user interface is provided presenting a visual indicator of whether fault-related events were caused by process tool hardware or a recipe performed on the hardware. As described in conjunction with FIG. 6 and FIG. 7 above, a user interface may include an x-axis to represent process recipes performed on various hardware and a y-axis to represent the various hardware (e.g., a manufacturing process tool and tool component) running the recipes. The intersection of each recipe with each hardware may be a cell. Each cell presents information relating to a particular hardware-recipe pair, that is, a particular recipe performed on particular hardware. The user interface may also include color for each cell to signify a value for a fault-related calculation. A number of red cells along a vertical axis (a column of cells) may indicate that fault-related events are related to or caused by a problematic recipe. As a result, a process engineer may investigate and adjust the recipe parameters for a particular recipe. A number of red cells along a horizontal axis (a row of cells) may indicate that a particular hardware, for example, a specific tool-chamber may be problematic hardware. As a result, an equipment support engineer may calibrate the hardware. The method continues to block 821 of FIG. 8B.

Figure 12:
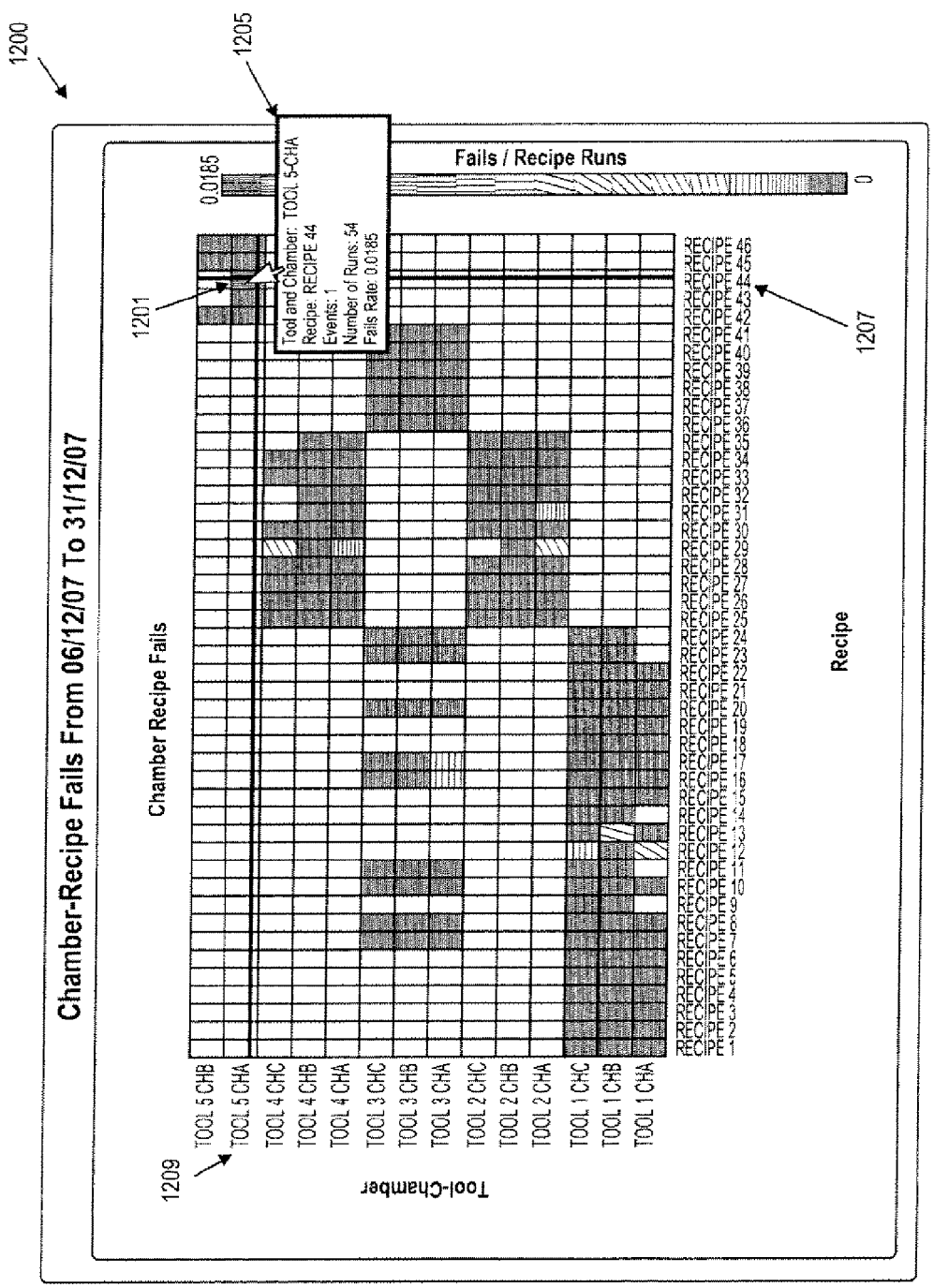
FIG. 12 illustrates an exemplary GUI to present additional information for a hardware-recipe pair, in accordance with one embodiment of the invention.

At block 821, a determination is made as to whether to present additional information for a particular hardware-recipe pair. If, at block 821, the method determines that additional information is not to be presented, the method continues to block 825. If, at block 821, the method determines that additional information is to be presented, another user interface displaying additional information may be provided at block 823. FIG. 12 is an exemplary GUI 1200 for presenting additional information for a particular hardware-recipe pair, in accordance with one embodiment of the invention.

A selection of an individual cell 1201 in GUI 1200 may trigger another user interface 1205 (e.g., a box) to be presented. GUI 1205 may provide detailed information relating to the fault-related events for the hardware-recipe pair represented by cell 1201. In this example, GUI 1205 presents detailed information for RECIPE 44 (1207) performed on TOOL5CHA (1209). GUI 1205 may include "Tool and Chamber," "Recipe," "Events," "Number of Runs," and "Fail Rate." In this example, GUI 1205 shows "Events:1" to represent one qualified alarm was reported during a total of 54 runs ("Number of Runs: 54") of RECIPE 44 on TOOL5CHA. As describe above, a fail rate may be calculated as the total number of qualified alarms reported for performing a recipe on a tool divided by the total number of runs of the recipe on the tool. In this example, GUI 1205 displays a resulting fail rate of 0.0185 for the hardware-recipe pair TOOL5CHA-RECIPE 44.

Figure 13A:
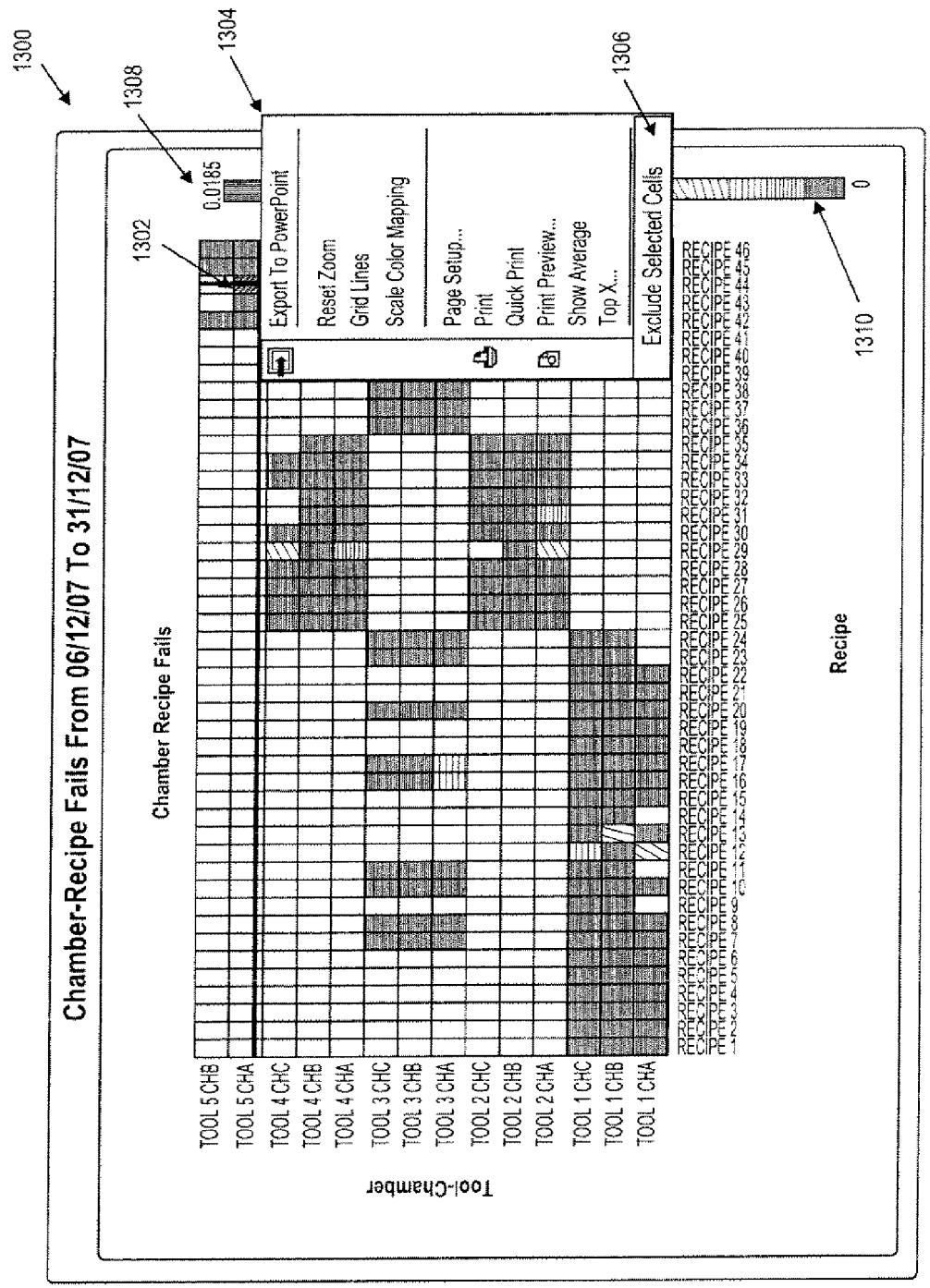
FIGS. 13A and 13B illustrate exemplary GUIs to exclude event log data from a failure analysis, in accordance with one embodiment of the invention.

Returning to FIG. 8B, at block 825, a determination is made as to whether to exclude data for a specific hardware-recipe pair. If, at block 825, the method determines that data for a specific hardware-recipe pair is not to be excluded, the method continues to block 829. If, at block 825, the method determines that data for a specific hardware-recipe pair is to be excluded, the selected data is excluded at block 827. FIG. 13A is an exemplary GUI 1300 for excluding data for a particular hardware-recipe pair, in accordance with one embodiment of the invention.

Figure 13B:
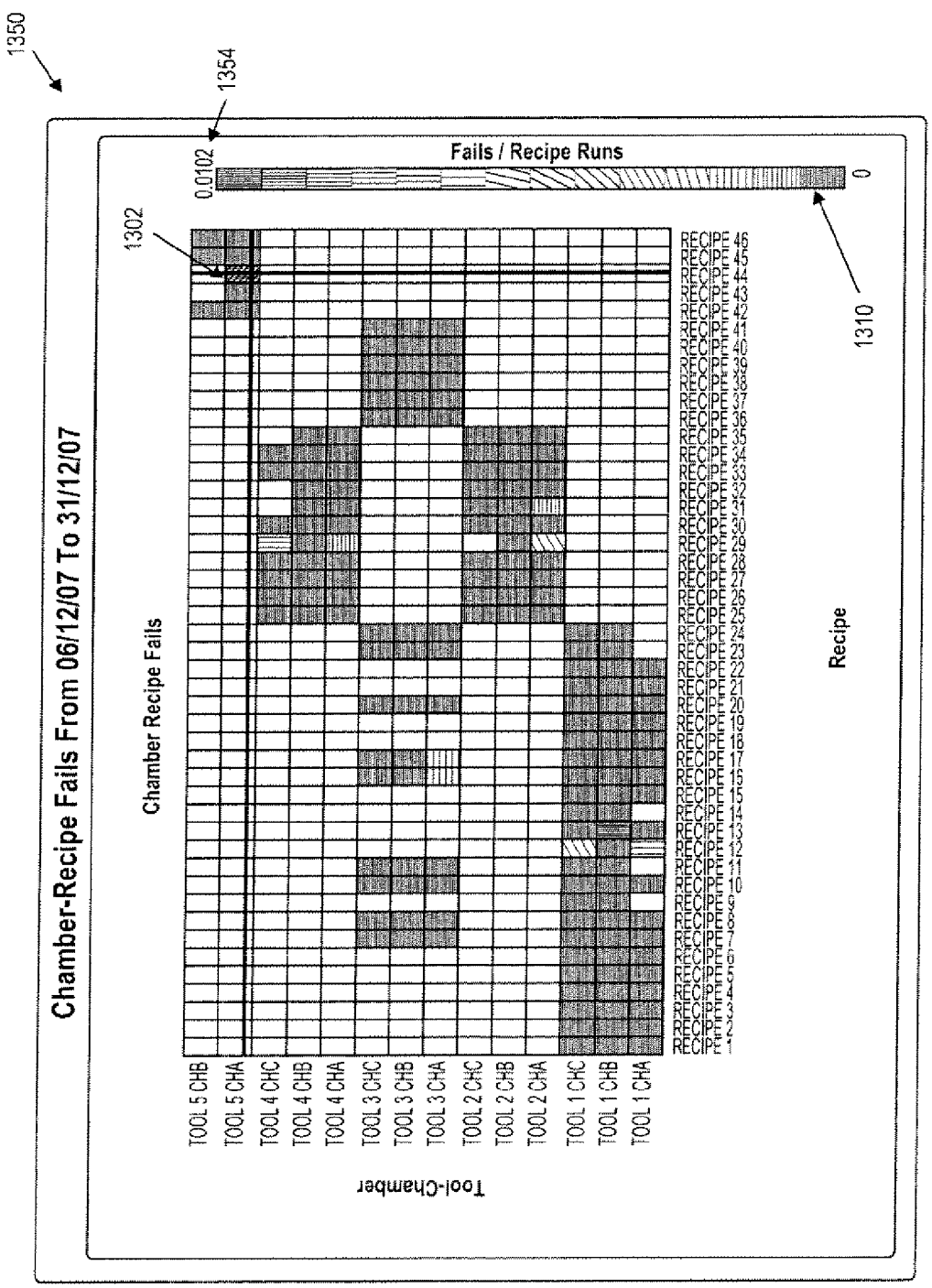

GUI 1300 illustrates that event log data for a specific hardware-recipe pair may be excluded when a cell displayed in a user interface is selected. In this example, selection of cell 1302 triggers user interface 1304. The selection of option 1306 from user interface 1304 may exclude the event log data corresponding to cell 1302 (e.g., the data corresponding to TOOL5CHA-RECIPE 44 pair) from a failure analysis. When data is selected for exclusion, GUI 1300 may be updated to present the fault-related events and statistics reflecting the excluded data. To illustrate; GUI 1300 displays a maximum fail rate of 0.0185 (1308) in color bar 1310 which reflects the inclusion of data corresponding to cell 1302. That is, the maximum fail rate of 0.0185 (1308) in color bar 1310 includes the event log data relating to cell 1302 in the failure analysis. FIG. 13B is an exemplary GUI 1350 illustrating an updated GUI reflecting a failure analysis excluding selected data. GUI 1350 shows that color bar 1310 is updated to display a maximum fail rate of 0.0102 (1354), which reflects the exclusion of the event log data relating to cell 1302. In one embodiment, when a cell is selected for exclusion, the cell is cross-hatched (1302). In other embodiments, a GUI may use other visual indicators (e.g., different patterns, different shading, different shapes, etc.) to represent exclusion of a cell.

Figure 14:
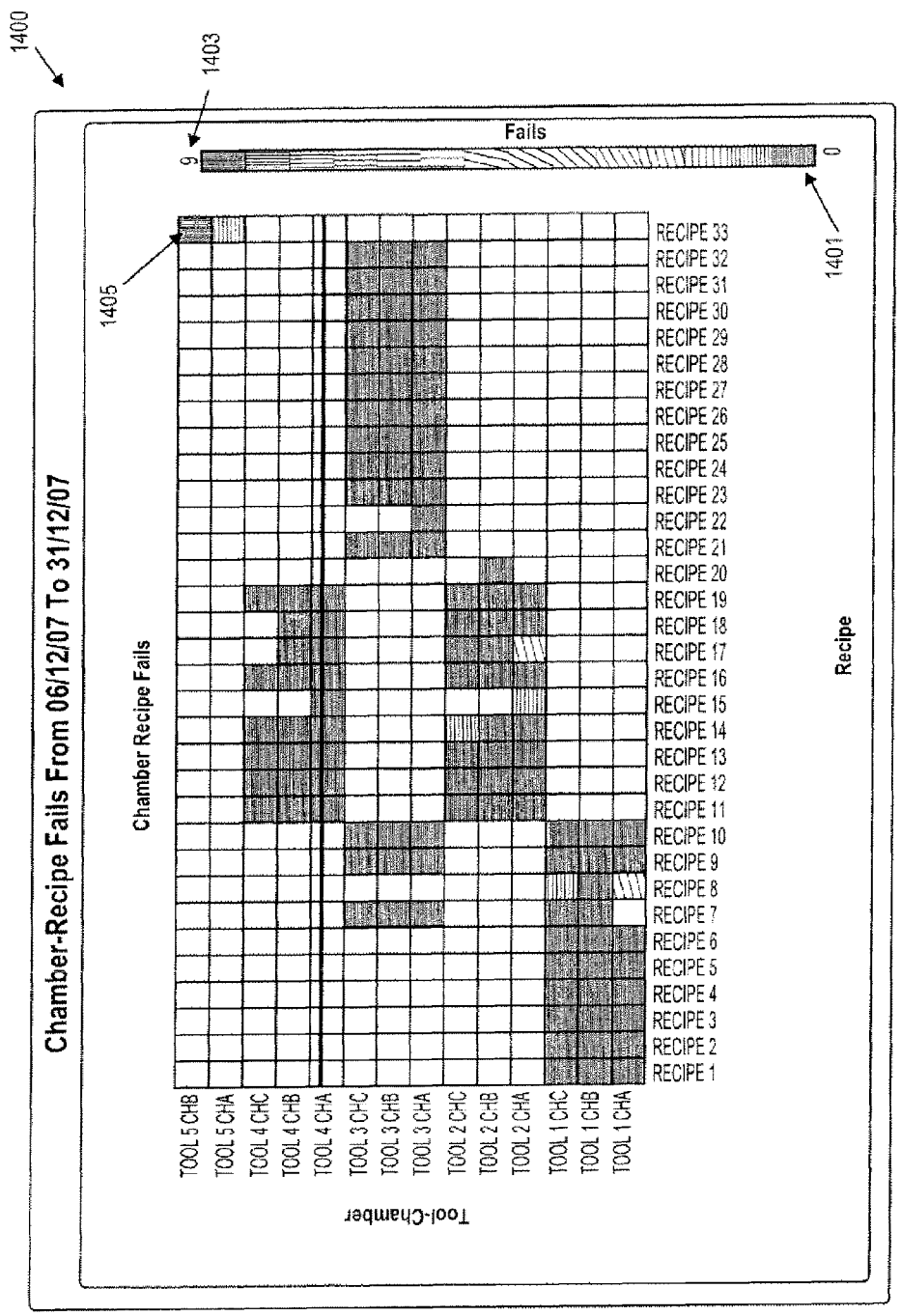
FIG. 14 illustrates an exemplary GUI to present fault-related events, in accordance with one embodiment of the invention.

Returning to FIG. 8B, at block 829, a determination is made as to whether to change the presentation of the fault-related events and statistics. For example, a user input may be received via a GUI to change the presentation of the fault-related events from fail rate to fail count. If, at block 829, the method determines that the presentation of the fault-related information is not to be changed, the method ends. If, at block 829, the method determines that the presentation of the fault-related information is to be changed, the presentation is changed at block 831. FIG. 14 is an exemplary GUI 1400 displaying a changed presentation of a fault-related events and statistics, in accordance with one embodiment of the invention. GUI 1400 may include color bar 1401 as a scale for fail count. In this example, GUI 1400 display a scale of a minimum fail count of zero and a maximum fail count of 9 (1403). Whereas, the previous FIG. 13B included a color bar 1310 as a scale for fail rate. In one embodiment, selection of cell 1405 (e.g., by double-clicking the cell) may trigger a user interface displaying detailed information relating to the nine events (qualified alarms) reported by TOOL5CHB in running RECIPE 33. FIG. 15 is an exemplary GUI 1500 to display detailed information relating to qualified alarms reported for a specific hardware-recipe pair, in accordance with one embodiment of the invention. The events reported in GUI 1500 may be displayed as they appear in an event log.

Figure 16:
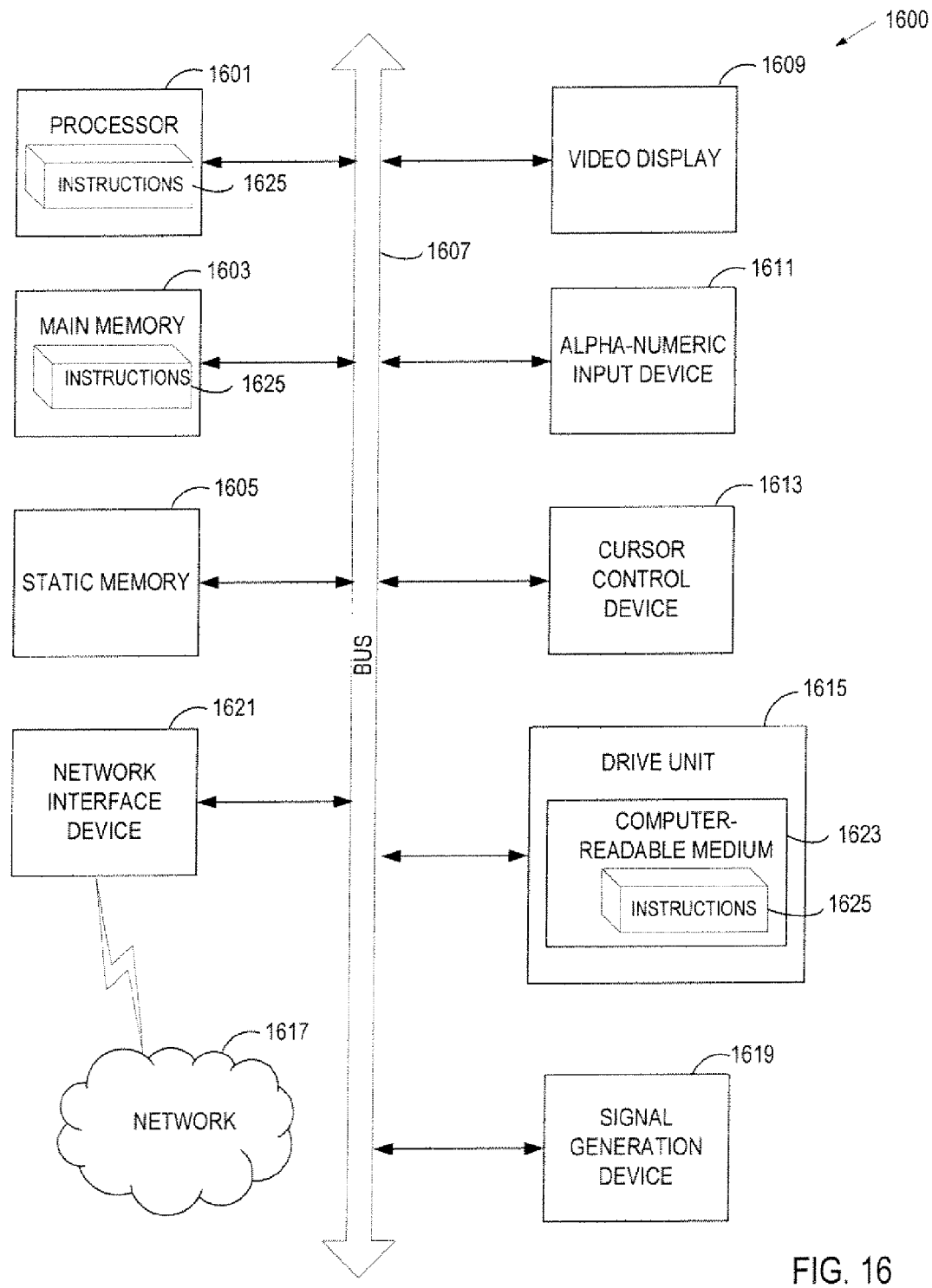
FIG. 16 illustrates an exemplary computer system.

FIG. 16 illustrates a diagrammatic representation of a machine in the exemplary form of a computer system 1600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1600 includes a processing device (processor) 1601, a main memory 1603 (e.g., read-only memory (ROM), flash memory, dynamic random access memory (DRAM) such as synchronous DRAM (SDRAM) or Rambus DRAM (RDRAM), etc.), a static memory 1605 (e.g., flash memory, static random access memory (SRAM), etc.), and a data storage device 1615 (e.g., drive unit), which communicate with each other via a bus 1607.

Processor 1601 represents one or more general-purpose processing devices such as a microprocessor, central processing unit, or the like. More particularly, the processor 1601 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1601 may also be one or more special-purpose processing devices such as an application specific integrated circuit (ASIC), a field programmable gate array (FPGA), a digital signal processor (DSP), network processor, or the like. The processor 1601 is configured to execute the processing logic 1625 for performing the operations and steps discussed herein.

The computer system 1601 may further include a network interface device 1621. The computer system 1601 also may include a video display unit 1609 (e.g., a liquid crystal display (LCD) or a cathode ray tube (CRT)), an alphanumeric input device 1611 (e.g., a keyboard), a cursor control device 1613 (e.g., a mouse), and a signal generation device 1619 (e.g., a speaker).

The data storage device 1615 may include a computer-readable storage medium 1623 on which is stored one or more sets of instructions 1625 (e.g., software) embodying any one or more of the methodologies or functions described herein. The software 1625 may also reside, completely or at least partially, within the main memory 1603 and/or within the processor 1601 during execution thereof by the computer system 1601, the main memory 1603 and the processor 1601 also constituting machine-accessible storage media. The software 1625 may further be transmitted or received over a network 1617 via the network interface device 1621.

The machine-accessible storage medium 1623 may also be used to store data structure sets that define user identifying states and user preferences that define user profiles. Data structure sets and user profiles may also be stored in other sections of computer system 1601, such as static memory 1605.

While the machine-accessible storage medium 1623 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description.

What is claimed is:

1. A computer-implemented method, comprising:
   providing a user interface to illustrate a plurality of fault-related events for a plurality of recipes performed on a plurality of manufacturing process hardware tools, wherein each of the plurality of fault-related events corresponds to one of the plurality of recipes being performed on one of the plurality of manufacturing process hardware tools;
   presenting in the user interface the plurality of recipes in a first axis and tool identifiers of the plurality of manufacturing process hardware tools in a second axis, wherein at least one manufacturing process hardware tool includes a plurality of processing chambers that are identified in the user interface in the second axis; and graphically indicating in the user interface whether the plurality of fault-related events were caused by one of the plurality of manufacturing process hardware tools or one of the plurality of recipes performed on the manufacturing process hardware tools.

2. The method of claim 1, wherein providing a user interface to illustrate a plurality of fault-related events comprises:

receiving event data for each of the plurality of manufacturing process hardware tools, the event data comprising activity information of the manufacturing process hardware tools; and analyzing the event data for each manufacturing process hardware tool to identify a plurality of fault-related events, wherein each of the plurality of fault-related events relates to performing one of a plurality of recipes on the manufacturing process hardware tool.

3. The method of claim 1, wherein each of the plurality of manufacturing process hardware tools includes a plurality of processing chambers that are identified in the user interface in the second axis.

4. The method of claim 1 wherein areas on the user interface where each of the plurality of recipes on the first axis intersect with each of the plurality of manufacturing process hardware tools on the second axis are cells, each cell corresponding to one of the plurality of recipes being performed on one of the plurality of manufacturing process hardware tools.

5. The method of claim 4 further comprising:

providing a visual indication of a fault-related calculation for each cell, the visual indication provided using at least one of different colors, different symbols, different patterns, different shading, different values or any combination thereof.

6. The method of claim 5, wherein each color is associated with a value for the fault-related calculation.

7. The method of claim 5, wherein providing a visual indication of a fault-related calculation for each cell comprises:

providing a user interface to define a qualified alarm;

receiving an input defining a qualified alarm; determining a number of qualified alarms reported for performing one of the plurality of recipes on one of the plurality of manufacturing process hardware tools; and performing a fault-related calculation for performing the one recipe on the one manufacturing process hardware tool.

8. The method of claim 7, wherein the fault-related calculation is a fail rate for performing the one recipe on the one manufacturing process hardware tool calculated as the number of qualified alarms reported in relation to a total number of times the one recipe is performed on the one manufacturing process hardware tool.

9. The method of claim 7, wherein the fault-related calculation is a fail count for performing the one recipe on the one manufacturing process hardware tool calculated as the number of qualified alarms reported for performing the one recipe on the one manufacturing process hardware tool.

10. The method of claim 5, further comprising presenting a user interface to illustrate additional information of the fault-related calculation for a cell.

11. The method of claim 2, further comprising:

providing a user interface to exclude event data;
receiving an input identifying event data to exclude; and
analyzing the event data, excluding the identified event data in the analysis, for each manufacturing process hardware tool to identify a plurality of fault-related events, wherein each of the plurality of fault-related events relates to performing one of a plurality of recipes on the manufacturing process hardware tool.

12. The method of claim 11, wherein event data to be excluded includes event data associated with at least one of the plurality of fault-related events based on a status of at least one manufacturing process hardware tool.

13. A machine-accessible non-transitory storage medium that provides instructions that, if executed by a machine, will cause the machine to perform operations, comprising:

providing a user interface to illustrate a plurality of fault-related events for a plurality of recipes performed on a plurality of manufacturing process hardware tools, wherein each of the plurality of fault-related events corresponds to one of the plurality of recipes being performed on one of the plurality of manufacturing process hardware tools;

presenting in the user interface the plurality of recipes in a first axis and tool identifiers of the plurality of manufacturing process hardware tools in a second axis, wherein at least one manufacturing process hardware tool includes a plurality of processing chambers that are identified in the user interface in the second axis; and graphically indicating in the user interface whether the plurality of fault-related events were caused by one of the plurality of manufacturing process hardware tools or one of the plurality of recipes performed on the manufacturing process hardware tools.

14. The machine-accessible non-transitory storage medium of claim 13, wherein providing a user interface to illustrate a plurality of fault-related events comprises:

receiving event data for each of the plurality of manufacturing process hardware tools, the event data comprising activity information of the manufacturing process hardware tools; and analyzing the event data for each manufacturing process hardware tool to identify a plurality of fault-related events, wherein each of the plurality of fault-related events relates to performing one of a plurality of recipes on the manufacturing process hardware tool.

15. The machine-accessible non-transitory storage medium of claim 13 further comprising:

providing a visual indication of a fault-related calculation for each cell, the visual indication provided using at least one of different colors, different symbols, different patterns, different shading, different values or any combination thereof.

16. The machine-accessible non-transitory storage medium of claim 15, wherein providing a visual indication of a fault-related calculation for each cell comprises:

providing a user interface to define a qualified alarm;
receiving an input defining a qualified alarm;
determining a number of qualified alarms reported for performing one of the plurality of recipes on one of the plurality of manufacturing process hardware tools; and
performing a fault-related calculation for performing the one recipe on the one manufacturing process hardware tool.

17. The machine-accessible non-transitory storage medium of claim 14, further comprising:

providing a user interface to exclude event data;
receiving an input identifying event data to exclude; and
analyzing the event data, excluding the identified event data in the analysis, for each manufacturing process hardware tool to identify a plurality of fault-related events, wherein each of the plurality of fault-related events relates to performing one of a plurality of recipes on the manufacturing process hardware tool.

18. The machine-accessible non-transitory storage medium of claim 17, wherein event data to be excluded is at least one of:
   at least one of the plurality of fault-related events, at least one of the plurality of manufacturing process hardware tools, at least one of the plurality of recipes.

19. A system comprising:
   a database to store event data for a plurality of recipes performed on a plurality of manufacturing process hardware tools, and to store fault-related calculations for the plurality of recipes performed on the plurality of manufacturing process hardware tools; and
   a graphical user interface (GUI) module, coupled to the database, to provide a user interface to illustrate a plurality of fault-related events for the plurality of recipes performed on the plurality of manufacturing process hardware tools, wherein each of the plurality of fault-related events corresponds to one of the plurality of recipes being performed on one of the plurality of manufacturing process hardware tools;
   present in the user interface the plurality of recipes in a first axis and tool identifiers of the plurality of manufacturing process hardware tools in a second axis, wherein at least one manufacturing process hardware tool includes a plurality of processing chambers that are identified in the user interface in the second axis; and
   graphically indicate in the user interface whether the plurality of fault-related events were caused by one of the plurality of manufacturing process hardware tools or one of the plurality of recipes performed on the manufacturing process hardware tools.

20. The system of claim 19, wherein areas on the user interface where each of the plurality of recipes on the first axis intersect with each of the plurality of manufacturing process hardware tools on the second axis are cells, each cell corresponding to one of the plurality of recipes being performed on one of the plurality of manufacturing process hardware tools.

21. The system of claim 20, wherein the GUI module is further to provide a visual indication of a fault-related calculation for each cell, the visual indication provided using at least one of different colors, different symbols, different patterns, different shading, different values or any combination thereof.

22. The system of claim 21, wherein to provide a visual indication of a fault-related calculation for each cell, the GUI module is further to:
   provide a user interface to define a qualified alarm;
   receive an input defining a qualified alarm;
   determine a number of qualified alarms reported for performing one of the plurality of recipes on one of the plurality of manufacturing process hardware tools; and
   perform a fault-related calculation for performing the one recipe on the one manufacturing process hardware tool.

23. The system of claim 22, wherein the fault-related calculation is a fail rate for performing the one recipe on the one manufacturing process hardware tool calculated as the number of qualified alarms reported in relation to a total number of times the one recipe is performed on the one manufacturing process hardware tool.

24. The system of claim 22, wherein the fault-related calculation is a fail count for performing the one recipe on the one manufacturing process hardware tool calculated as the number of qualified alarms reported for performing the one recipe on the one manufacturing process hardware tool.

* * * * *